(12) United States Patent  
Nishinohara et al.

(10) Patent No.: US 7,317,560 B2  
(45) Date of Patent: Jan. 8, 2008

(54) IMAGE READING APPARATUS AND IMAGE FORMING APPARATUS USING THE SAME

(75) Inventors: Takayuki Nishinohara, Tokyo (JP); Yasushi Ishida, Tokyo (JP); Shigeyuki Sugiyama, Hiratsuka (JP); Katsumi Obana, Funabashi (JP); Hiroyuki Noguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 11/032,173

(22) Filed: Jan. 11, 2005

(65) Prior Publication Data

US 2005/0157353 A1 Jul. 21, 2005

(30) Foreign Application Priority Data

Jan. 16, 2004 (JP) ............................. 2004-009550

(51) Int. Cl.
*H04N 1/04* (2006.01)
*H04N 5/253* (2006.01)

(52) U.S. Cl. ...................... 358/487; 358/474; 358/494; 348/96

(58) Field of Classification Search ................ 358/487, 358/474, 494, 486, 496, 493; 399/377; 348/96
See application file for complete search history.

(56) References Cited

U.S. PATENT DOCUMENTS

| 4,248,530 A * | 2/1981 | Bockemuhl-Simon et al. ........................... 355/74 |
| 5,767,945 A | 6/1998 | Fields et al. .................. 355/39 |
| 5,780,829 A | 7/1998 | Tsai et al. .................... 235/454 |
| 5,790,187 A * | 8/1998 | Suzuki ........................ 348/96 |
| 6,239,817 B1 | 5/2001 | Meyer .......................... 347/36 |
| 6,297,874 B1 | 10/2001 | Ikeda et al. ................... 355/40 |
| 6,411,324 B1 | 6/2002 | Christiansen et al. ....... 347/248 |
| 6,415,115 B1 | 7/2002 | Moritani ...................... 399/82 |
| 6,417,937 B1 | 7/2002 | Batten et al. |
| 6,612,240 B1 | 9/2003 | Silverbrook et al. ..... 101/424.1 |
| 6,791,724 B2 * | 9/2004 | Khovaylo et al. .......... 358/497 |
| 6,947,185 B2 * | 9/2005 | Khovaylo et al. .......... 358/474 |
| 6,982,809 B2 | 1/2006 | Kagaya ..................... 358/1.18 |
| 2003/0202222 A1 | 10/2003 | Amimoto et al. |
| 2004/0246543 A1 * | 12/2004 | Kurokawa et al. ......... 358/509 |
| 2005/0157354 A1 | 7/2005 | Ishida et al. ................ 358/487 |
| 2005/0179960 A1 | 8/2005 | Obana et al. ............... 358/449 |
| 2005/0190412 A1 | 9/2005 | Noguchi et al. ............ 358/474 |

FOREIGN PATENT DOCUMENTS

| CN | 2278971 | 4/1998 |
| CN | 1453738 | 11/2003 |
| JP | 64-47155 | 3/1989 |

(Continued)

*Primary Examiner*—Houshang Safaipour
(74) *Attorney, Agent, or Firm*—Fitzpatrick, Cella, Harper & Scinto

(57) ABSTRACT

In an image reading apparatus that can read a reflection original and transparent original, a film holder for holding the transparent original is provided to be pivotal to the left or right about a shaft as the center. After the transparent original is set such that its image can be seen correctly, when the film holder is brought down to the right, the film can be set correctly concerning its upper and lower sides. At this time, as the film holder is held by the reading apparatus, its positional shift can also be prevented.

3 Claims, 22 Drawing Sheets

FOREIGN PATENT DOCUMENTS

| | | |
|---|---|---|
| JP | 03-62668 | 3/1991 |
| JP | 6-5251 | 1/1994 |
| JP | 06-46219 | 2/1994 |
| JP | 8-331494 | 12/1996 |
| JP | 10-126578 | 5/1998 |
| JP | 10-224528 | 8/1998 |
| JP | 10-233920 | 9/1998 |
| JP | 2000-358132 | 12/2000 |
| JP | 2001-265547 | 9/2001 |
| JP | 2001-313784 | 11/2001 |
| JP | 2002-77539 | 3/2002 |
| JP | 2003-5304 | 1/2003 |
| JP | 2003-75944 | 3/2003 |
| JP | 2003-110844 | 4/2003 |
| JP | 2003-202633 | 7/2003 |
| JP | 2003-303065 | 10/2003 |
| JP | 2003-305925 | 10/2003 |
| JP | 2004-5559 | 1/2004 |
| JP | 2004-7547 | 1/2004 |

\* cited by examiner

F I G. 17
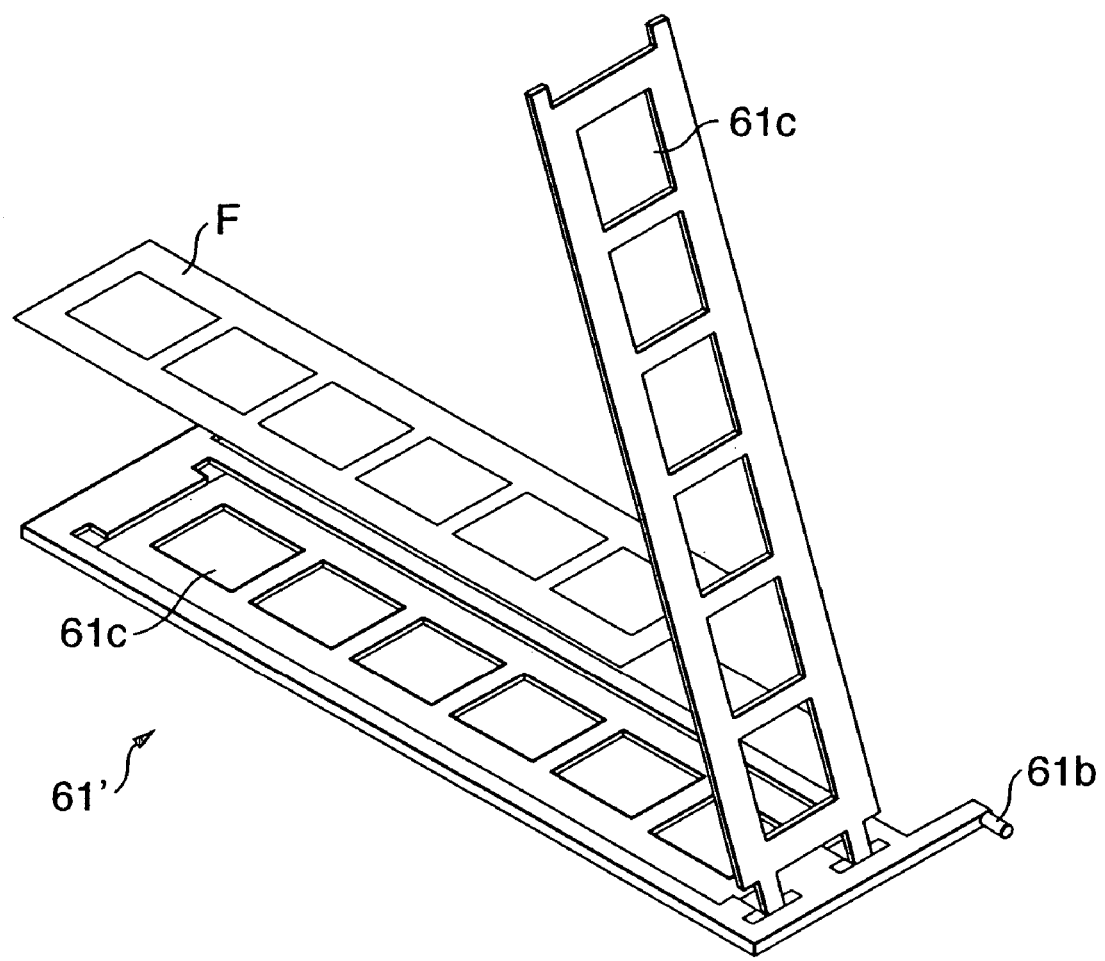

F I G. 22
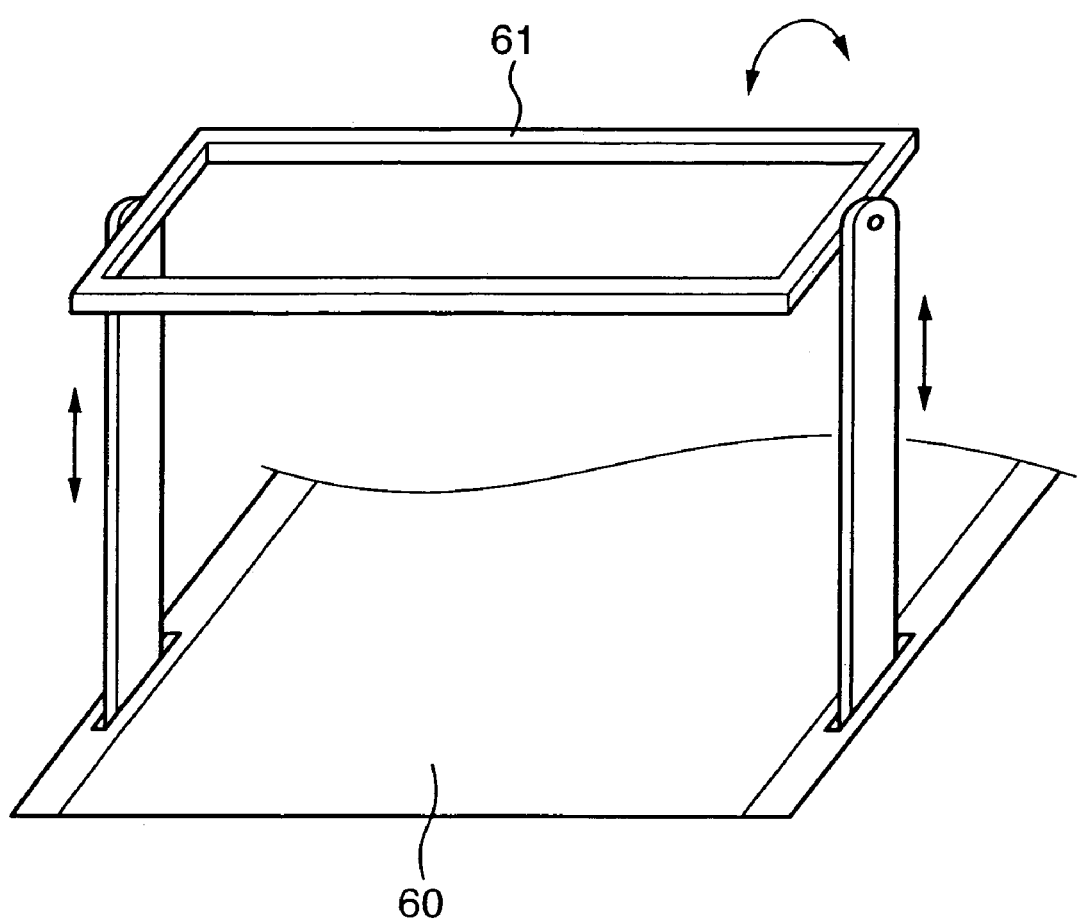

IMAGE READING APPARATUS AND IMAGE FORMING APPARATUS USING THE SAME

FIELD OF THE INVENTION

The present invention relates to an image reading apparatus having an image reading unit that can read a reflection original and transparent original, and an image forming apparatus which uses the image reading apparatus.

BACKGROUND OF THE INVENTION

An image reading unit, such as an image scanner, copying machine, or the like, one having the function of reading images on two types of originals, i.e., a reflection original such as a magazine and a transparent original such as a photographic film, is known.

The image reading unit includes a unit main body incorporating an image reader having a built-in image sensor or the like, and a platen unit pivotally provided to the unit main body and located on the unit main body. A transparent original light source is incorporated in the platen unit.

When an image on a transparent original such as a film is to be read, the transparent original is placed on an original table glass formed on the upper surface of the unit main body. The transparent original light source incorporated in the unit main body is turned on and light transmitted through the transparent original is detected by the image reader. Thus, the transparent original image is read.

Conventionally, when a transparent original is to be read, the transparent original is put in a holding tool called a film holder, and the film holder is set on the original table glass. Usually, the illumination range of the transparent original light source is smaller than the size of the original table glass, and accordingly the transparent original must be set in a transparent original reading area on the original table glass. Conventionally, in some image reading apparatus, in order to facilitate the setting operation, the film holder is set by abutting it against one corner of the original table glass by using the corner of the rectangular film holder as a positioning portion. Thus, a transparent original in the film holder is set in the transparent original reading area (for example, see Japanese Patent Laid-Open Nos. 2000-358132 and 2003-5304).

The above conventional examples have the following problems.

Conventionally, in the image reading apparatus that can read images on two types of originals, i.e., a reflection original and transparent original, the transparent original is mounted in the film holder, and the film holder is placed on the original table glass, as described above. The film holder is a member separate from the reading unit and used only when a transparent original is to be read. Hence, the film holder is kept at a place different from the image reading apparatus, and taken out and used when necessary.

Generally, an image reading apparatus of this type is often used to read an image on a reflection original rather than a transparent original, and a film holder is not used frequently. For this reason, once the user wishes to read a film image, the film holder may sometimes be missed, and the film image cannot be read. Also, it is cumbersome to prepare the film holder.

In the image reading apparatus of this type, usually, a transparent original readable area where the image can be read by illuminating the transparent original is smaller than a reflection original readable area. Accordingly, to read the film image correctly, the film holder must be placed at a position where the mounted film comes in the transparent original readable area. Considering the process after the reading, it is important to set the film holder such that the mounted film may not be read with a skew.

According to the method disclosed in Japanese Patent Laid-Open Nos. 2000-358132 and 2003-5304, the film holder is positioned by abutting its corner against one corner of the original table glass. As the film holder is placed by merely abutting its corner against the corner of the original table glass, if the user accidentally touches the film holder with his or her hand or when the user closes the platen unit, the position of the film holder may be shifted. Consequently, the film is set such that it is partly outside the transparent original reading area, or may be set with a skew. Accordingly, part of the film image cannot be read, or a skew image is read.

Conventionally, when an image is to be read while the film is set in a film holder, the film holder must be set such that the upper surface (base surface) of the film opposes the reading unit main body and that the lower surface (emulsion surface or film surface) of the film opposes the transparent original light source. When the film is mounted in the film holder and the film holder is set on the original table, whether the upper surface of the film faces up or the lower surface of the film faces up cannot be distinguished easily, and a setting error is hardly noticeable. Sometimes the film is erroneously set such that its upper surface opposes the transparent original light source, and the image is read while the user does not notice that the upper and lower surfaces of the film are reversed. Then, an image is read with the upper and lower surfaces reversed.

SUMMARY OF THE INVENTION

It is the main object of the present invention to provide an image reading apparatus which solves the problems of the prior art and an image forming apparatus which uses the image reading apparatus.

According to an aspect of the present invention, the foregoing object is attained by providing an image reading apparatus having a reflection original light source, a transparent original light source, and an image reading unit capable of reading a reflection original irradiated by the reflection original light source and a transparent original irradiated by the transparent original light source, comprising: an original table where the reflection original is to be placed; and a holding unit, attached at a predetermined position of the original table, adapted to hold the transparent original, wherein the holding unit is attached to the original table to be capable of selectively setting at either one of first and second positions that are different from each other by 180° in direction with respect to the original table while the holding unit is kept attached to the original table without being detached from the original table.

According to another aspect of the present invention, the foregoing object is attained by providing an image reading apparatus having a reflection original light source, a transparent original light source, and an image reading unit capable of reading a reflection original irradiated by the reflection original light source and a transparent original irradiated by the transparent original light source, comprising: an original table where the reflection original is to be placed; and a holding unit, attached at a predetermined position of the original table, adapted to hold the transparent original, wherein the holding unit is attached to the original table to be capable of selectively setting at either one of a first position where one surface of the transparent original opposes the original table and a second position where the other surface of the transparent original opposes the original table while the holding unit is kept attached to the original table without being detached from the original table.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a perspective view of the film holder;

FIG. 22 is a view for describing a structure according to another embodiment of the present invention.

DETAILED DESCRIPTION OF THE PREFERRED EMBODIMENTS (First Embodiment)

Preferred embodiments of the present invention will now be described in detail in accordance with the accompanying drawings.

Note that the dimensions, materials, shapes, relative positions, and the like of the components described in the embodiment below are merely examples. The scope of the present invention is not limited to these, unless otherwise specified.

In the following embodiment, as an example of an image forming apparatus that uses an image reading apparatus according to the present invention, an image reading/printing apparatus will be described which has the copying function of reading and printing an original image, the printing function of printing on the basis of data supplied from a computer, the scanner function of reading the original image and sending image data to the computer, and the film scanner function of reading a film image and sending image data to the computer. The image reading apparatus according to the present invention can also apparently be applied to other arbitrary image forming apparatuses, e.g., a copying machine or facsimile apparatus, that use an image reading apparatus.

Figure 1:
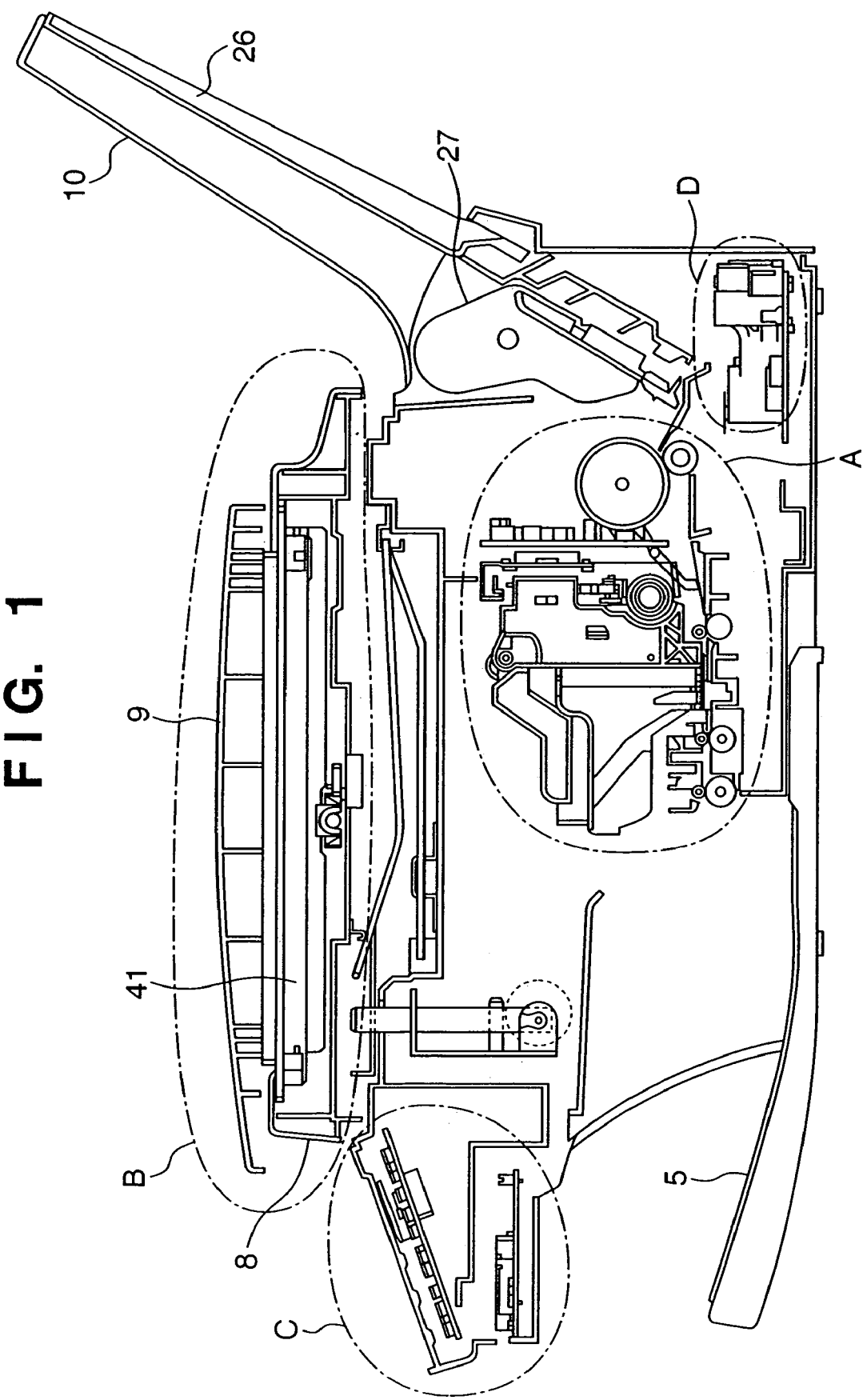
FIG. 1 is a sectional view of an image reading/printing apparatus according to the first embodiment of the present invention.
Figure 2:
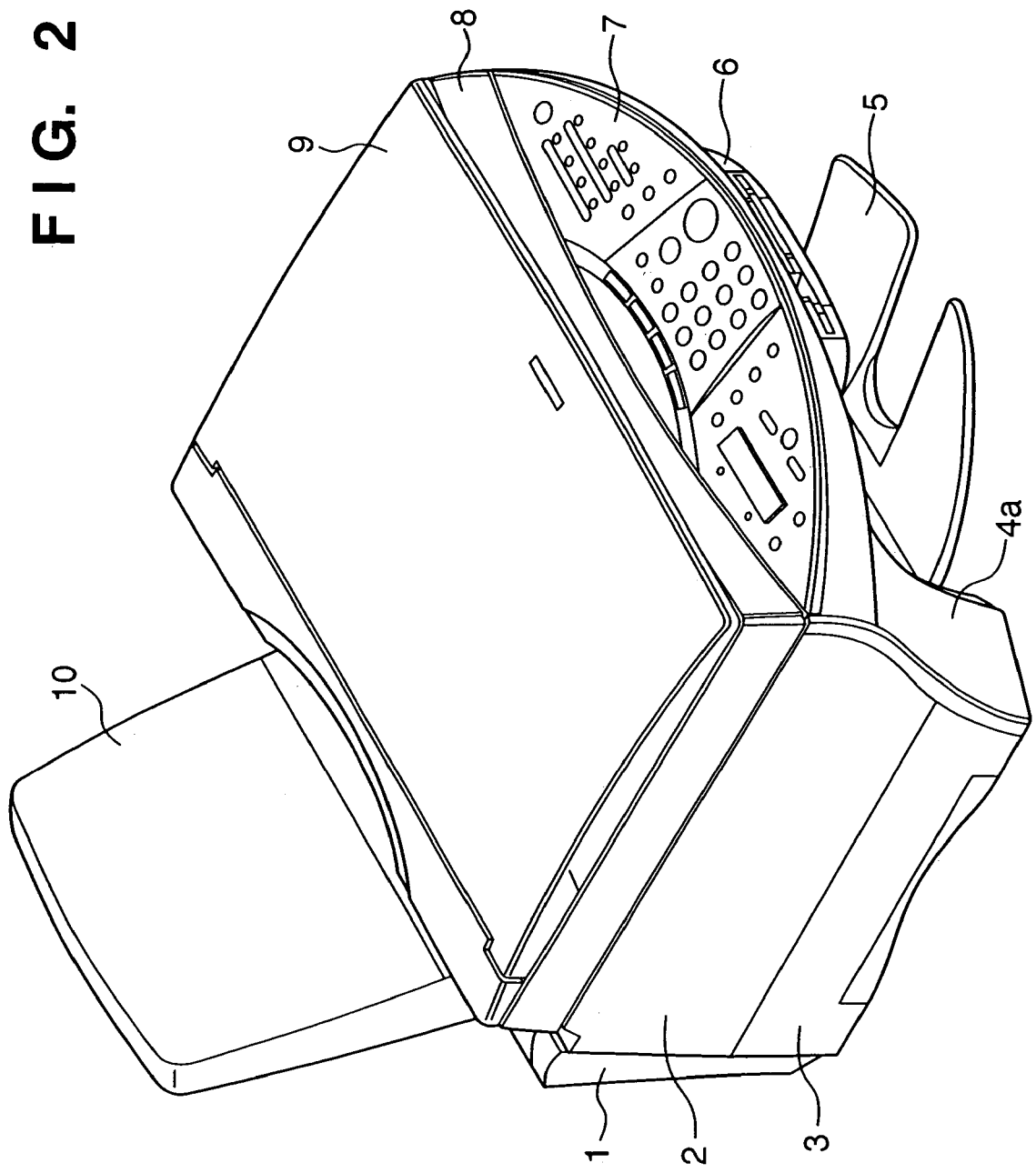
FIG. 2 is a perspective view of the image reading/printing apparatus according to the first embodiment of the present invention.
Figure 20:
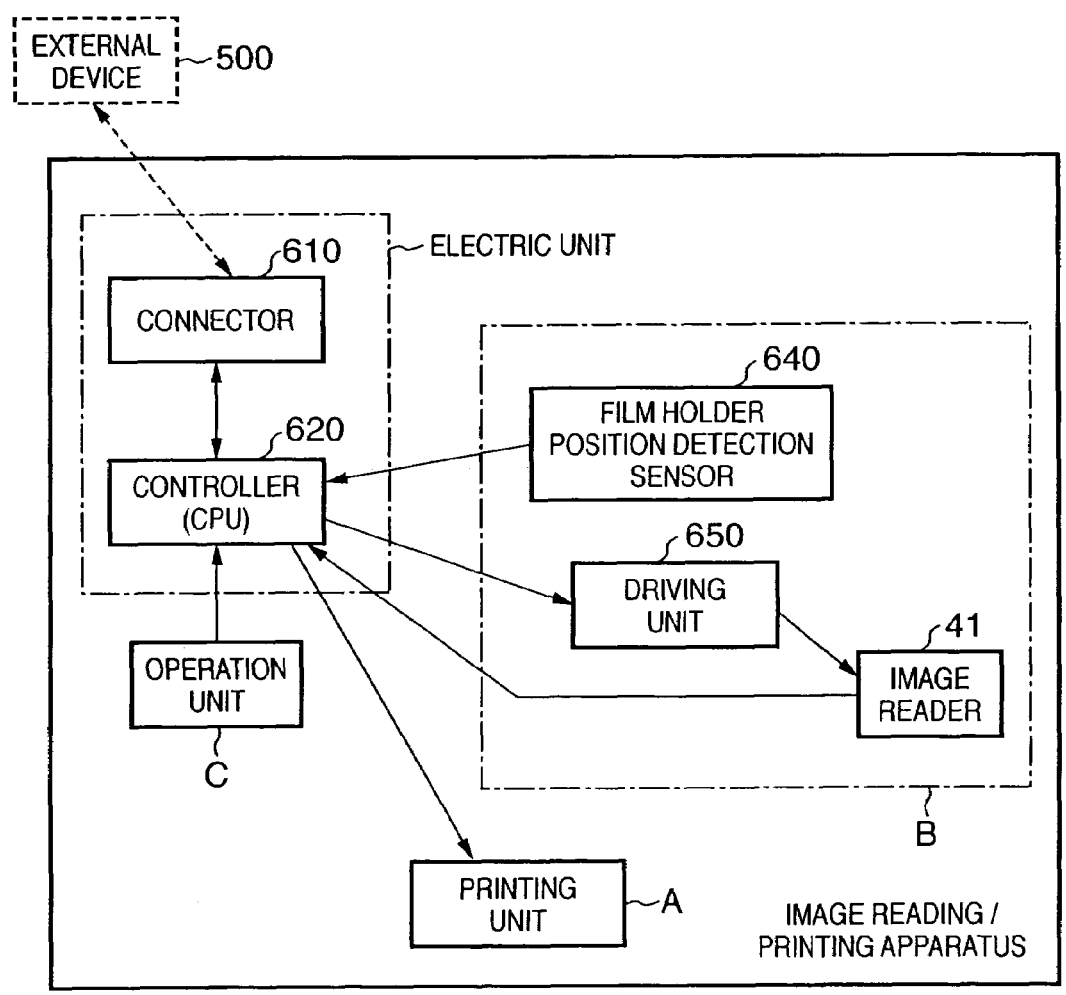
FIG. 20 is a block diagram showing the structure of the main function of an image reading/printing apparatus according to an embodiment of the present invention.

FIG. 1 is a schematic sectional view of the image reading/printing apparatus according to this embodiment, FIG. 2 is a perspective view showing the appearance of the same, and FIG. 20 is a block diagram showing the structure of the main function of the same.

As shown in FIGS. 1 and 20, the image reading/printing apparatus according to this embodiment includes a printing unit A, reading unit B, operation unit C, power supply unit, electric unit, and housing. The printing unit A includes an inkjet printing apparatus. The reading unit B optically reads an original. A display, operation keys, and the like are disposed on the operation unit C. The power supply unit D supplies power to the apparatus. A controller 620 for controlling the entire apparatus and a connector 610 for connecting an external device such as a host computer and a communication network are gathered at, e.g., one portion, to form the electric unit. The housing covers the above apparatus components. The controller 620 includes a ROM which stores, e.g., a control program, a CPU which performs the control program, and a RAM as an work area. The controller 620 controls these units in accordance with the control program, to control the operation of the image reading/printing apparatus including a transparent original reading process (to be described later).

The reading unit B includes a film holder position detection sensor 640 for detecting the position of a film holder, an image reader 41 which incorporates a reflection original light source and reads a reflected light image or transmitted light image by an image sensor, and a driving unit 650 which moves the image reader 41 in a sub-scanning direction. In FIG. 20, an arrangement that is not directly related to the present invention is not shown.

As shown in FIG. 2, this housing includes a rear cover 1 which covers the rear surface of the apparatus, a middle cover 2 located at the middle side portion of the apparatus, a bottom cover 3 at the lower portion of the apparatus, a left front cover 4a located at the left of the front surface of the apparatus, a right front cover 4b (see FIG. 4) located at the right of the front surface of the apparatus, a lower operation unit cover 6 located under the operation unit C, an operation panel 7 located on the lower operation unit cover 6, a scanner cover 8 which covers the reading unit B, a platen unit 9 which presses an original placed in the reading unit B from above, and a printing paper cover 10.

Figure 3:
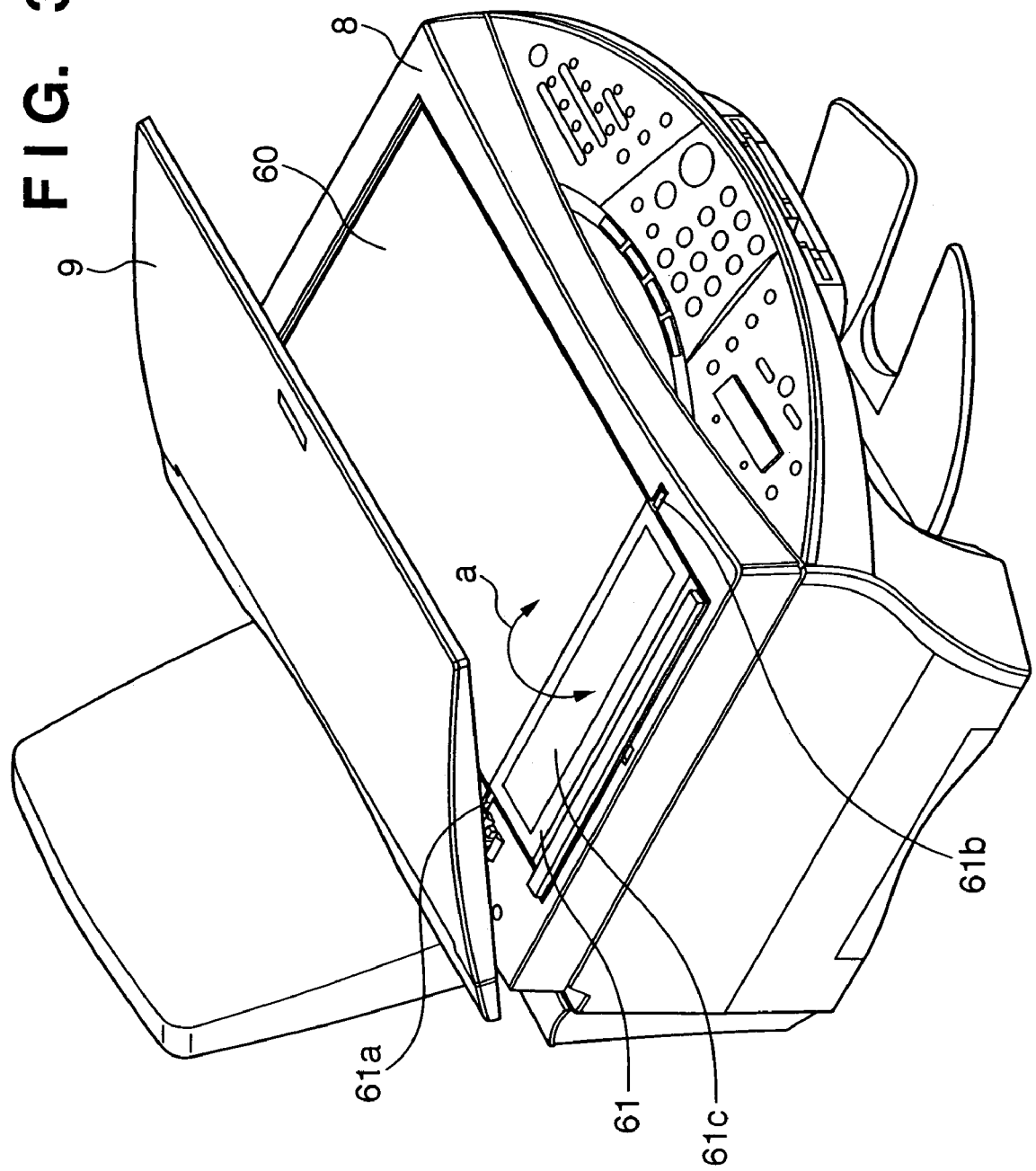
FIG. 3 is a perspective view of FIG. 2 showing a state wherein a platen unit is open.

As shown in FIG. 3, the platen unit 9 can be pivoted through hinges disposed at the two portions of its end, and can hang over an original table glass 60.

Figure 5:
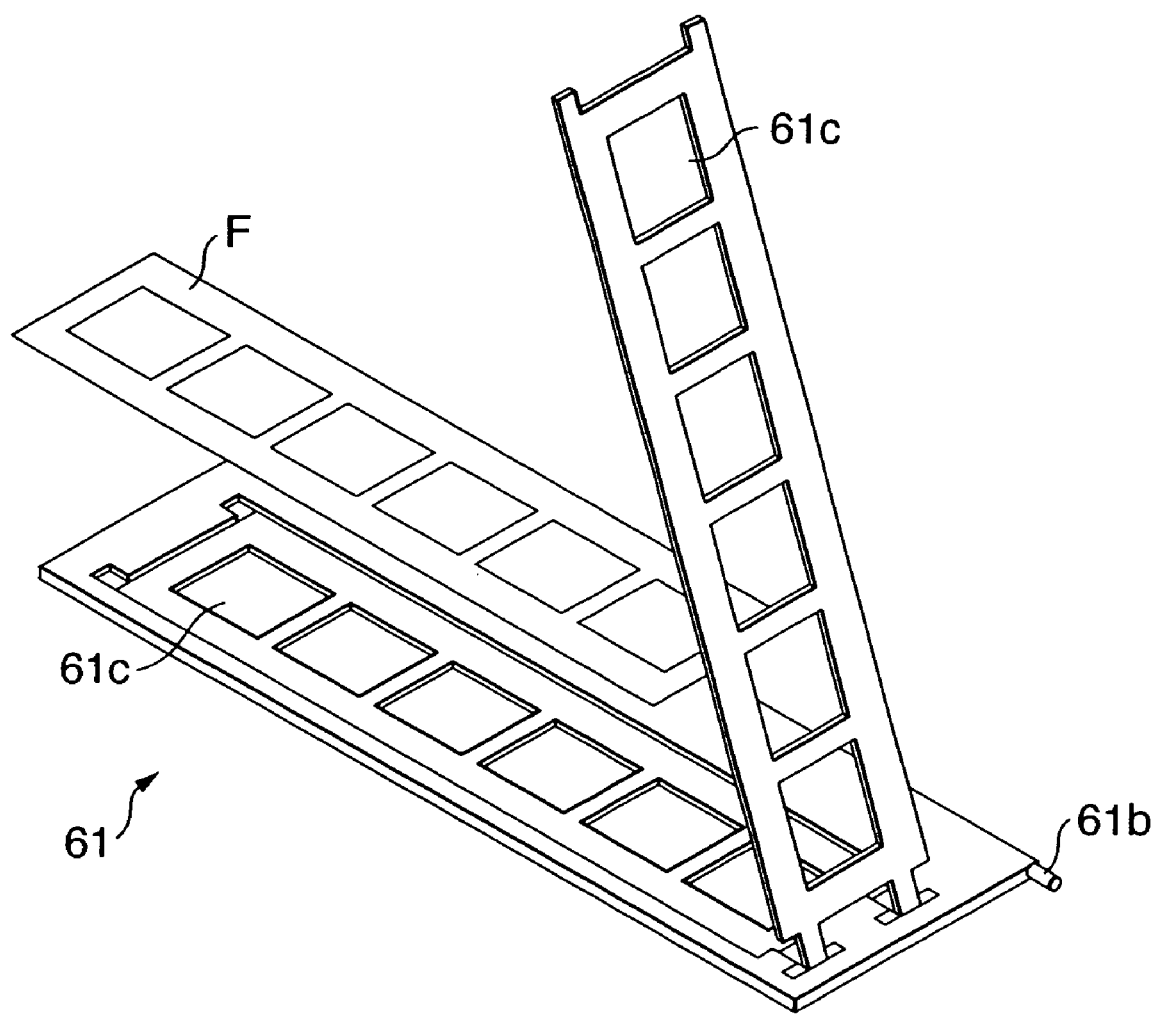
FIG. 5 is a perspective view of a film holder.

A film holder 61 is arranged at the left end of the original table glass 60. FIG. 5 is a perspective view of the film holder 61. The film holder 61 is used when a transparent original is to be read. The outline of opening 61c of the film holder 61 forms a rectangle with a size that surrounds an exposure range corresponding to four to six frames of a 35-mm stripfilm F. The longitudinal axis of the opening 61c is parallel to the main-scanning axis (the back-and-forth-direction axis of the apparatus of FIG. 3) of the reading unit B.

The film holder 61 can hold the 35-mm stripfilm F (to be referred to as a negative film hereinafter) and set the film at a predetermined position on the original table glass 60. Although a film holder for holding a negative film is described in this embodiment, the film holder may be one for a positive film or one that can hold both positive and negative films.

Figure 4:
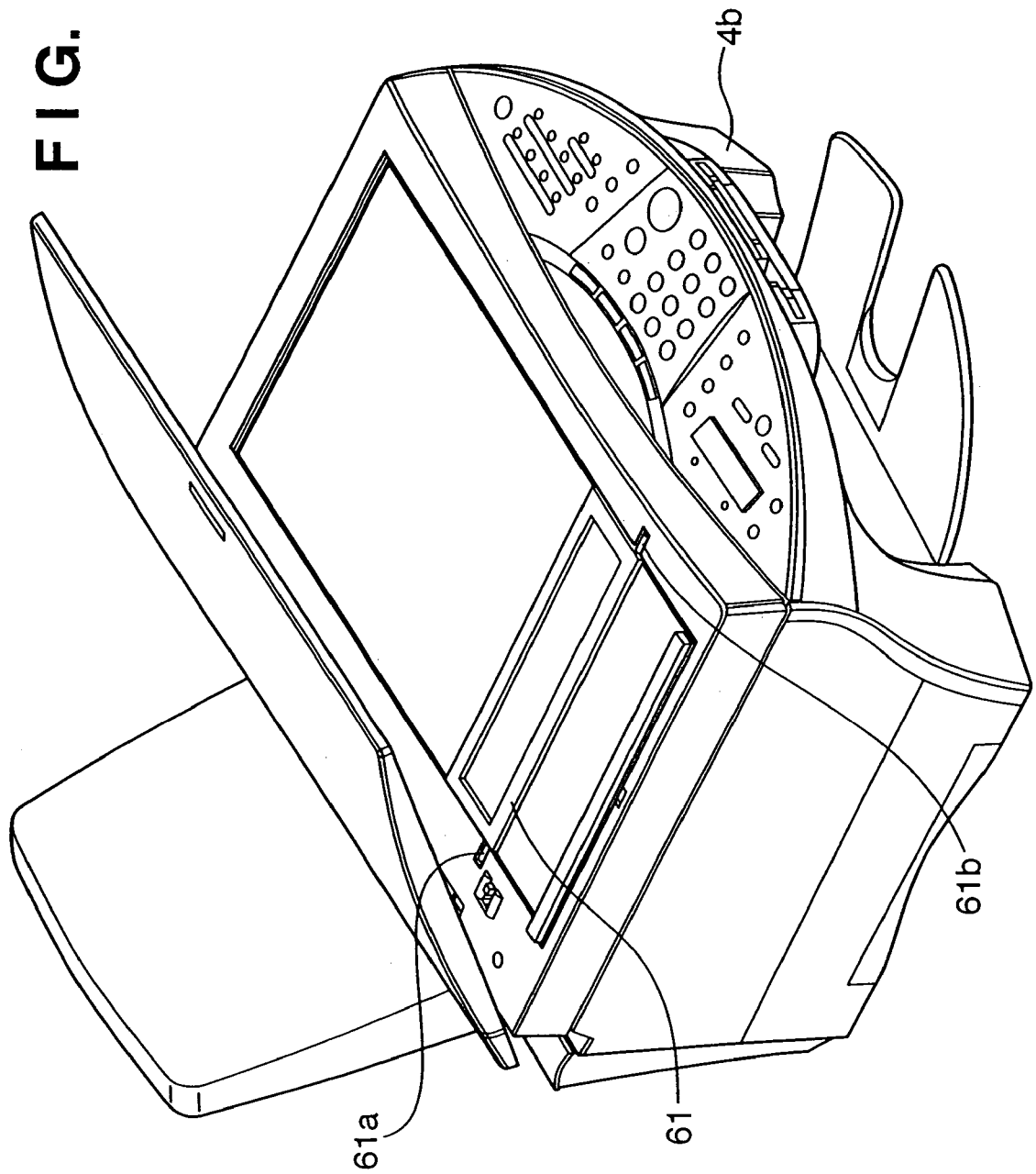
FIG. 4 is a perspective view of FIG. 3 showing a state wherein a film holder is rotated to the right and brought down.

Round shafts 61a and 61b are formed at the two ends in the longitudinal direction of the film holder 61 to share a central shaft extending in the longitudinal direction. The round shafts 61a and 61b are attached to the upper surface of the scanner cover 8 so as to be pivotal as indicated by an arrow a about an axis that connects the central axes of the round shafts 61a and 61b as the rotation center. The film holder 61 can be easily mounted and detached by the user, and is set by, e.g., fitting the round shafts 61a and 61b in recesses formed in the upper surface of the scanner cover 8. FIG. 4 shows a state wherein the film holder 61 is rotated through 180° about the round shafts 61a and 61b as the rotation center and brought down on the original table glass 60.

The round shafts 61a and 61b are arranged on the scanner cover 8 such that when the film holder 61 in the state of FIG. 3 is rotated through 180° and set in the state shown in FIG. 4, the film holder 61 is positioned in the transparent original reading area. A holder sensor (not shown) which detects the state of the film holder 61 is arranged in the vicinity of the round shaft 61a and in the reading unit B. The holder sensor is formed of a photo-interrupter sensor. When the film holder 61 is brought down to the right, a rib (not shown) extending from the film holder 61 interrupts the slit of the photo-interrupter sensor, so that the holder sensor can detect the state of the film holder 61.

Figure 8:
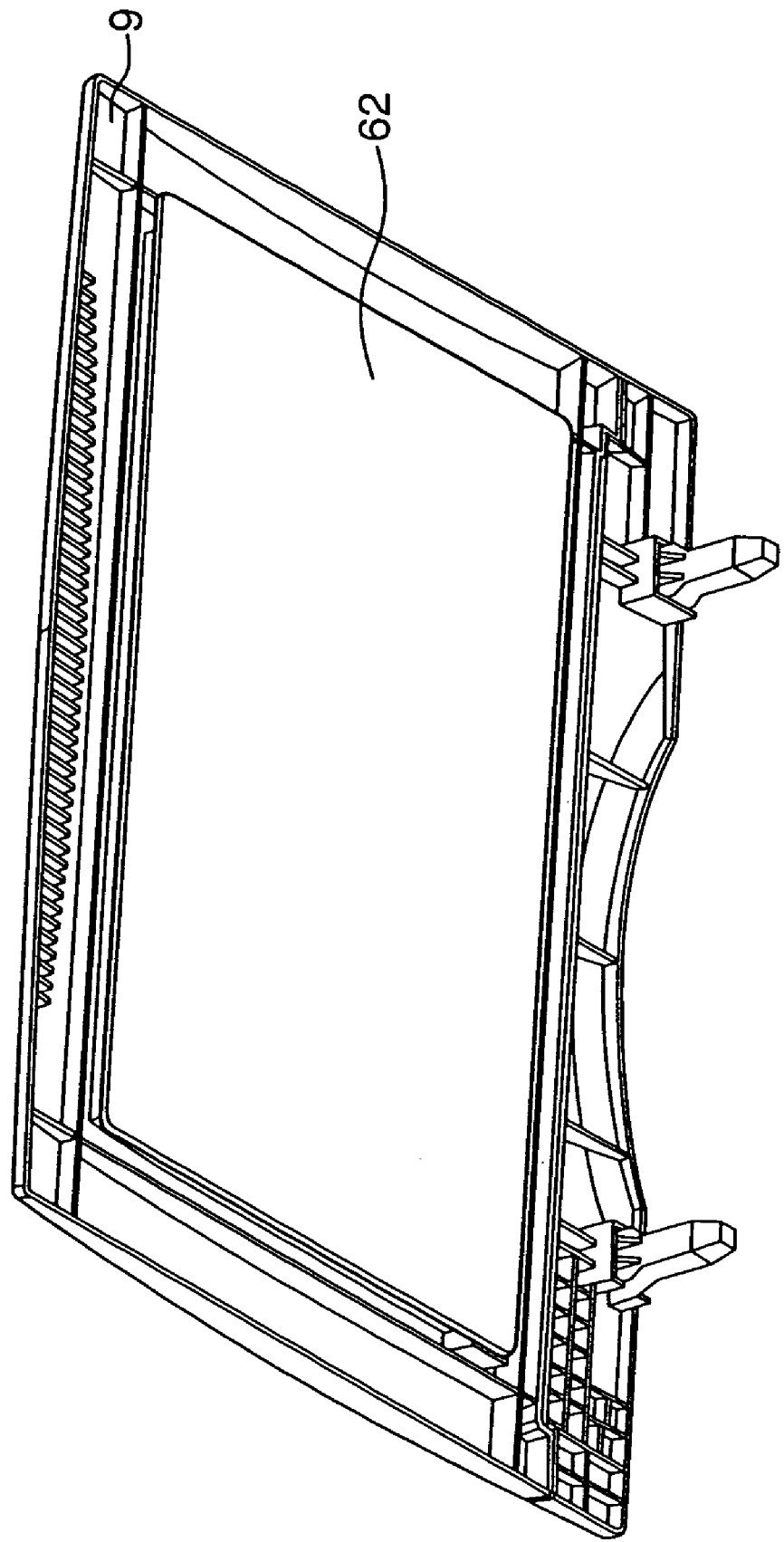
FIG. 8 is a perspective view showing the structure of the platen unit of the image reading/printing apparatus according to the first embodiment of the present invention.

The structure of the platen unit 9 will be described with reference to FIGS. 4 and 8. FIG. 8 is a perspective view the platen unit 9 seen from the lower surface.

A white sheet unit 62 is disposed on the platen unit 9 to come into tight contact with the original table glass 60 when the platen unit 9 is closed. The white sheet unit 62 is formed by stacking a white sheet, sponge, and plate-like plastic member sequentially. The sponge is provided between the white sheet and plate-like plastic member so that even when a thick original is to be read, the platen unit 9, including its peripheral portion, can be brought into tight contact with the original table glass 60.

The white sheet unit 62 is attached to the platen unit 9 as it is caught on a pawl-shaped portion (not shown) extending from the platen unit 9, and can be removed from the platen unit 9 by removing it from the pawl-shaped portion.

Figure 9:
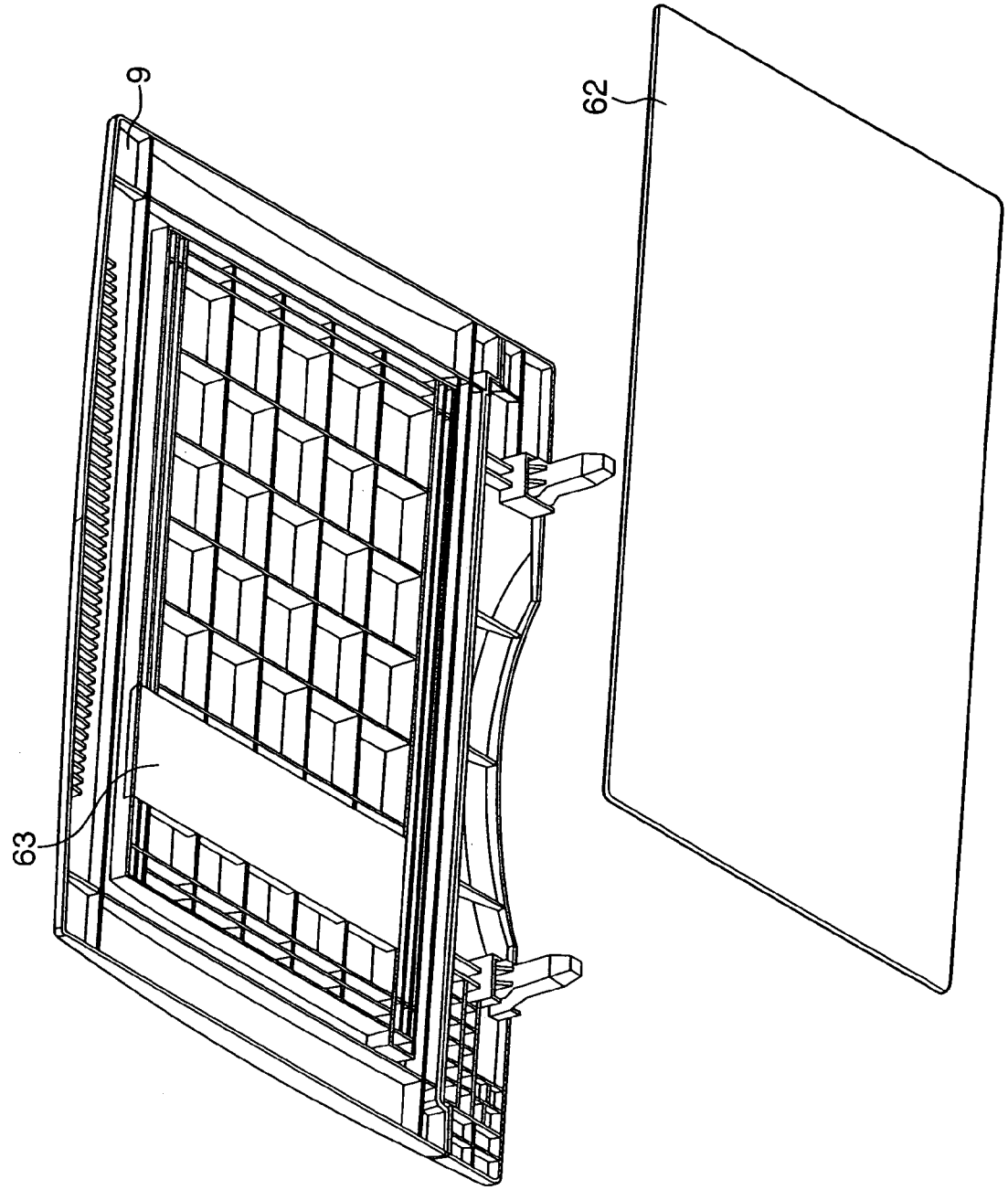
FIG. 9 is a perspective view showing a state of FIG. 8 from which a white sheet unit is removed.

As shown in FIG. 9, a transparent original light source 63 is arranged between the white sheet unit 62 and platen unit 9. The transparent original light source 63 irradiates the film when reading a film image. The transparent original light source 63 has a diffusion plate (not shown), a surface emission unit comprising a light source (not shown), e.g., a fluorescent light, arranged in the vicinity of the diffusion plate, and a light source driving circuit.

Figure 6:
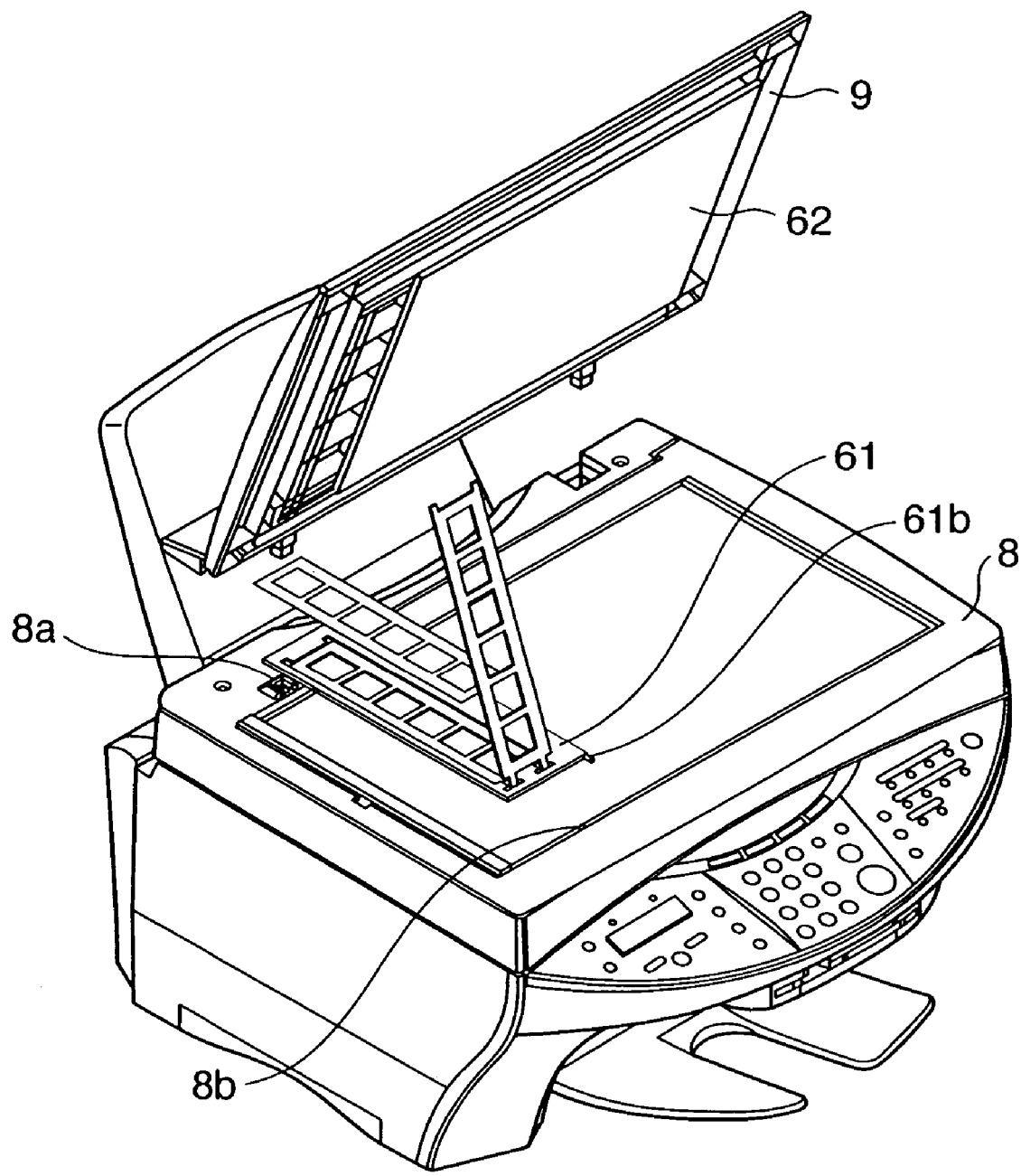
FIG. 6 is a perspective view showing how to attach the film holder to the image reading/printing apparatus.
Figure 7:
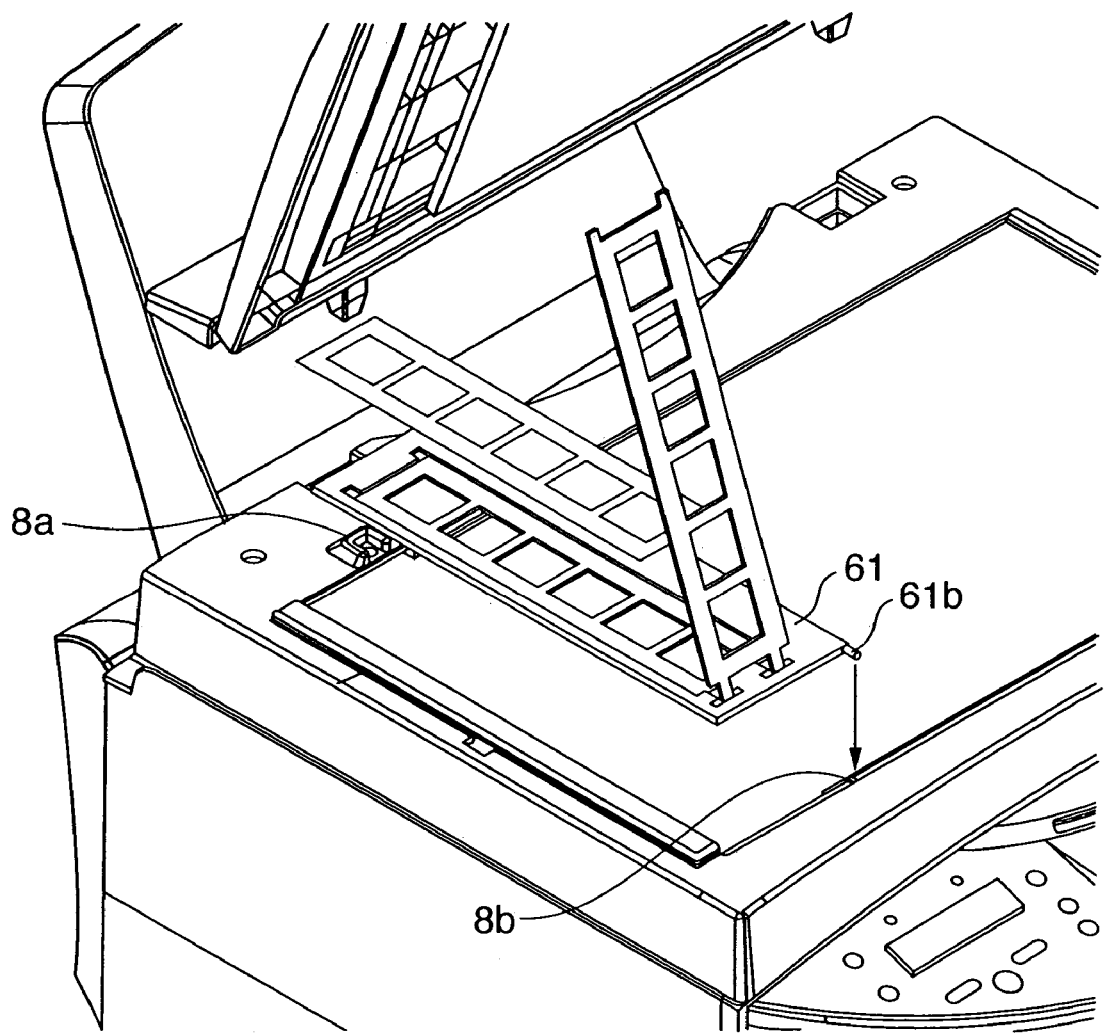
FIG. 7 is an enlarged view of FIG. 6.

FIG. 6 is a perspective view showing how to attach the film holder 61 to the image reading/printing apparatus, and FIG. 7 is an enlarged view of FIG. 6. The round shafts 61a and 61b of the film holder 61 are set by fitting them in the recesses formed in the upper surface of the scanner cover 8. First, the round shaft 61b is inserted in a recess 8b formed in the front side of the upper surface of the scanner cover 8. Subsequently, the round shaft 61a is fitted in a recess 8a formed in the deep side of the upper surface of the scanner cover 8. The film holder 61 is thus attached to the scanner cover 8 of the image reading/printing apparatus.

When a reflection original placed on the original table glass 60 is to be read, while the film holder 61 is at the position shown in FIG. 3, the platen unit 9 is closed onto the original table glass 60. In this state, the film holder 61 should not interfere with the white sheet unit 62. For this purpose, the white sheet unit 62 does not extend over the film holder 61 side.

When an image on a negative film is to be read by using the image reading/printing apparatus according to this embodiment, the film holder 61 at the position of FIG. 3 is opened as shown in FIG. 5, and the negative film is mounted in the film holder 61. Whether or not the upper and lower sides of the film are correct is checked. After that, the film holder 61 is rotated to the right and brought down on the original table glass 60 (to the state shown in FIG. 4). Subsequently, after the white sheet unit 62 is removed, the platen unit 9 is closed onto the original table glass 60, and image reading of the negative film is started. This procedure and the operation of the apparatus will be described later in detail. The directions to open and close the film holder 61 to mount the film in the film holder 61 are not limited to those shown in FIGS. 5 to 7.

The position of the transparent original light source 63 and the positions of the round shafts 61a and 61b of the film holder 61 are determined such that, in the state shown in FIG. 4, when the platen unit 9 is moved to hang over the original table glass 60, the opening 61c of the film holder 61 opposes the irradiation area of the transparent original light source 63.

Conveyance of the printing paper as the target printing material will be described. Note that ordinary regular cut sheets are to be used in this embodiment.

As shown in FIG. 1, the image reading/printing apparatus according to this embodiment has an automatic sheet feeder 26. A plurality of ordinary regular cut sheets are stacked and stored in the automatic sheet feeder 26. The automatic sheet feeder 26 can guide the side surface of the printing paper in accordance with the size of the printing paper by a slider 27 movable in a direction perpendicular to the surface of the sheet. The printing paper cover 10 is provided to prevent dust from being deposited on the stacked printing paper or a foreign substance from entering the printing unit.

The printing paper stored and stacked on the automatic sheet feeder 26 are separated and conveyed one by one by a feed roller and separation pad (neither is shown). After that, each separated sheet is clamped and conveyed to the printing unit A.

In the printing unit A, a printhead prints. The printing unit A includes the printhead, a delivery roller which is located downstream of the printhead and conveys the printed printing paper downstream in the apparatus, and a spur which is located to oppose the delivery roller and made of a material with which the ink is not transferred to the spur even when the spur comes into contact with the printing surface of the printing paper.

The printing paper conveyed by the delivery roller and spur, among the printhead, delivery roller, and spur, is delivered onto a printing paper delivery tray 5 provided to the front of the apparatus main body.

The structure of the printing unit A according to this embodiment will be described.

In this embodiment, the inkjet printing unit A is used, as described above. However, the present invention is not limited to this, but any arbitrary image forming means such as an electrophotographic image forming means can be employed. An inkjet printhead generally includes a fine liquid discharge port (orifice), a liquid channel, an energy acting portion formed at part of the liquid channel, and an energy generating means for generating a liquid droplet forming energy to act on a liquid located at the acting portion. The printhead is replaceable.

The energy generating means for generating the energy to discharge ink can be, e.g., one which uses an electromechanical transducer such as a piezoelectric element, one which radiates electromagnetic waves, such as a laser, to cause the liquid to absorb the energy and accordingly generate heat, so that liquid droplets are discharged by the operation of heat generation and are caused to fly, and one which heats the liquid by an electrothermal transducer so that the liquid is discharged.

In a printhead, among these energy generating means, which is used for inkjet printing with which the liquid is discharged by the heat energy, liquid discharge ports (orifices) for discharging printing liquid droplets to form flying liquid droplets can be arranged at high density. Thus, high-resolution printing can be performed.

A printhead which uses the electrothermal transducer as the energy generating means can be made entirely compact more easily than other printheads. Also, this printhead can efficiently utilize the advantages of the IC technique and micromachining technique which have progressed largely and the reliability of which has improved remarkably in the recent semiconductor field.

As the printhead that uses an electrothermal transducer can be formed long or formed into a flat sheet (two-dimensionally) easily, it can realize a multiple of nozzles and high-density packaging easily. With the printhead which uses the electrothermal transducer, an inkjet printhead that can be manufactured on a mass production basis with a high productivity and at a low manufacturing cost can be provided.

Therefore, in this embodiment as well, the printing unit A uses a printhead in which ink is discharged from a discharge port at the distal end of a nozzle by the pressure of film boiling occurring in the ink when the electrothermal transducer generates heat.

The inkjet printhead which uses an electrothermal transducer as the energy generating means, in this manner, and is manufactured by a semiconductor manufacturing process generally has liquid channels corresponding to respective ink discharge ports. When the heat energy acts on a liquid that fills a liquid channel, the liquid is discharged from the corresponding ink discharge port.

The inkjet printhead is provided with the electrothermal transducer as the means for forming flying liquid droplets. The liquid is supplied to the respective liquid channels from a common liquid chamber communicating with the respective liquid channels.

The structure of the electric unit in the image reading/printing apparatus will be described.

More specifically, the electric unit includes a system control board which mainly controls the system of the entire apparatus, a printer control board which mainly controls the printing system, the power supply unit D which supplies power to the apparatus, an operation control board where the keys and LEDs of the operation panel are mounted, and the like.

Of these components, the operation control board is arranged as the operation unit C on the front surface of the apparatus obliquely from the viewpoint of operation easiness.

As shown in FIG. 1, the power supply unit D is entirely arranged under the feed unit. The system control board is arranged on one side (right in FIG. 1) of the apparatus, between the printing unit A and reading unit B.

The operation unit C includes various types of key switches such as a ten-key pad, to input operation instruction for the apparatus and various types of information. The operation unit C is formed of LCDs, LEDs, and the like, and provided with a display that displays the state of the apparatus and the like.

The structure of the reading unit B will be described with reference to FIG. 10 as the sectional view which shows the schematic arrangement of the reading unit B.

The image reader 41 incorporates a reflection original light source 101 as a linear light source such as, e.g., an LED array, a plurality of mirrors 104a to 104c, a condenser lens 102, and an image sensor 103, and can move, on the lower side of the original table glass 60 serving as an original table, to the right or left on the surface of the sheet of drawing while keeping a constant distance from the original table glass 60. Image data based on the read image is transmitted to the image processing unit, i.e., controller, of the image reading/printing apparatus through a flexible cable or the like.

Figure 10:
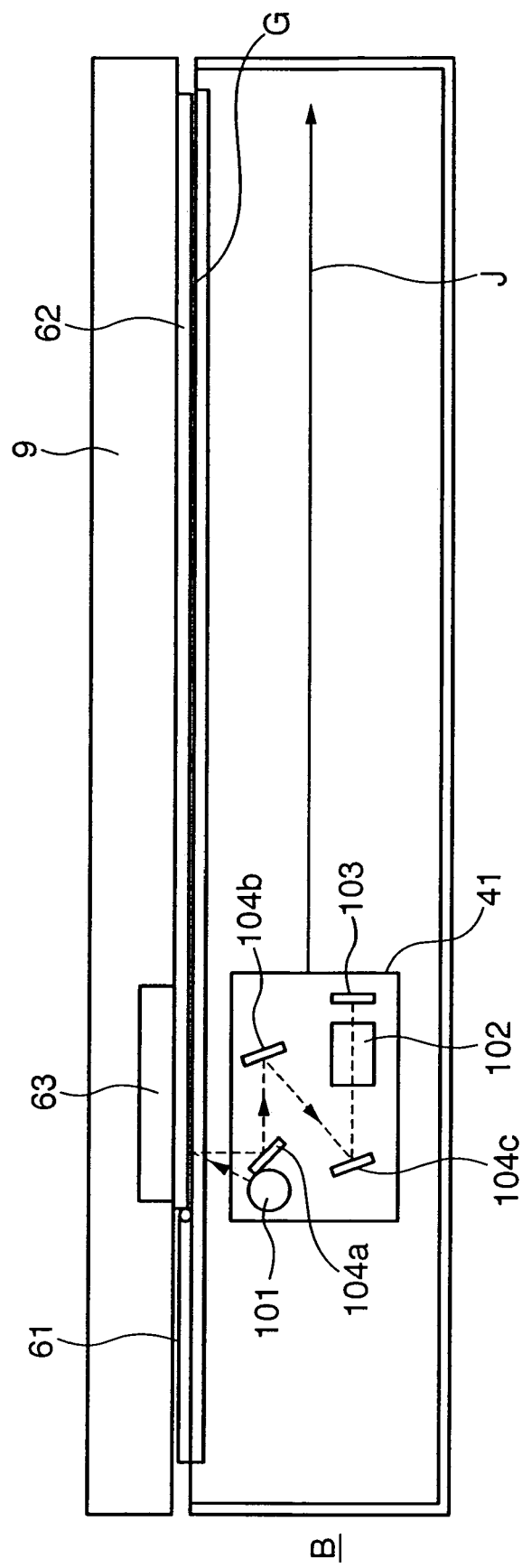
FIG. 10 is a sectional view of the image reading/printing apparatus according to the first embodiment of the present invention showing the state of a reading unit B when a reflection original is to be read.

The image sensor 103 shown in FIG. 10 uses a linear sensor. The linear sensor is formed by aligning a plurality of photoelectric converting elements in a substantially linear array to be perpendicular to the moving direction of the carriage (in this case, the moving direction of the image reader 41). As the photoelectric converting elements, photodiodes, CCDs (Charge Coupled Devices), MOS transistor switches, or the like are used. The direction of array of the photoelectric converting elements of the linear sensor defines the main scanning direction, and the moving direction of the carriage defines the sub-scanning direction. The linear sensor accumulates charges obtained by photoelectrically converting light in a predetermined wavelength range, e.g., visible, light, infrared light, or ultraviolet light, for a predetermined period of time, and outputs an electrical signal corresponding to the received light quantity. In this embodiment, a lens-reduced linear image sensor is used. Alternately, a tight-contact-type image sensor can be used.

The driving unit 650 (FIG. 20) which moves the main scanning line of the image sensor 103 in the sub-scanning direction includes a timing belt locked by the housing (carriage) of the image reader 41, a stepping motor for rotating the belt, a shaft parallel to the sub-scanning direction, and the like (neither is shown). The carriage is slidably locked to a shaft and reciprocal parallel to the plate surface of the original table glass 60. The driving unit 650 belt-drives the carriage by the motor in response to an instruction from the controller 620, to convey the linear sensor 103 and reflection original light source 101 parallel to the plate surface of the original table glass 60.

Reading of the reflection original will be described with reference to FIG. 10. A reflection original G is placed on the original table glass 60 such that its image reading surface faces down (to oppose the original table glass 60). The platen unit 9 is rotated so as to hang over the original table glass 60. At this time, the reflection original G is pressed by the white sheet unit 62 not to loosen up from the original table glass 60.

As shown in FIG. 10, in the reading unit B of this embodiment, an area excluding an area where the film holder 61 has been brought down to the left forms a reflection original reading range. Therefore, as far as the film holder 61 is brought down to the left, even if the reflection original is to be read, the film holder 61 need not be detached.

Figure 11:
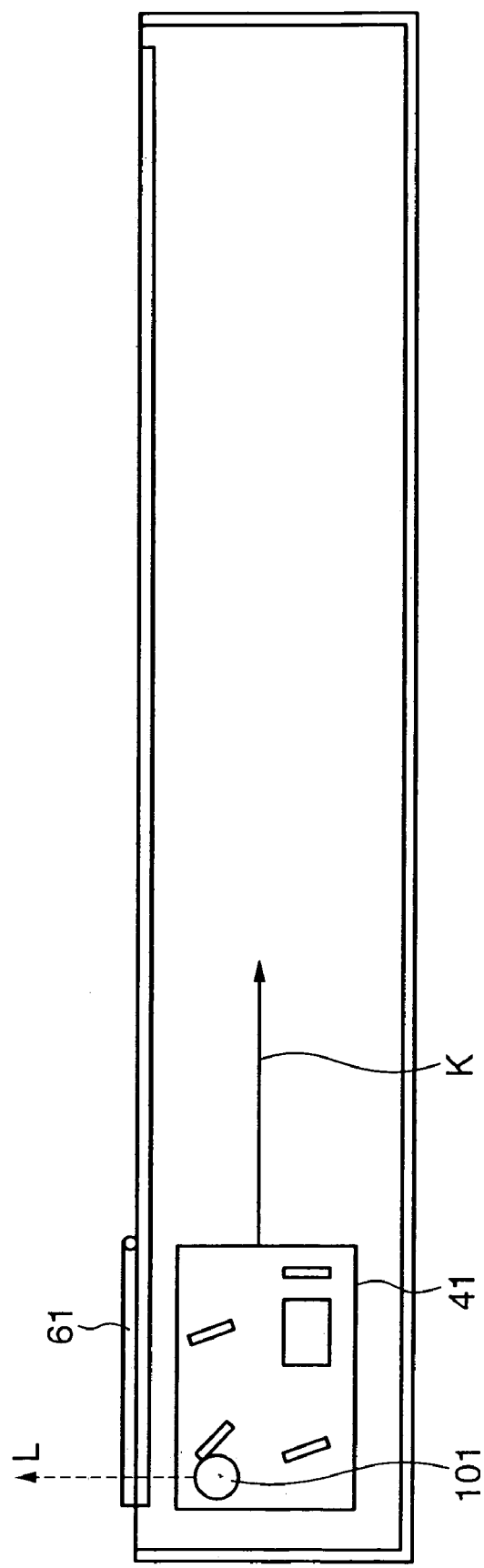
FIG. 11 is a sectional view of the image reading/printing apparatus according to the first embodiment of the present invention showing the state of the reading unit B when the set state of a transparent original is to be checked.

When an image on the reflection original G is to be read, light L radiated from the reflection original light source 101 is reflected by the reflection original G on the original table glass 60, as indicated by a broken line in FIG. 11. The reflected light forms an image on the light-receiving portion of the image sensor 103 through the mirrors 104a to 104c and condenser lens 102. The carriage moves in a direction (direction of an arrow J in FIG. 10) parallel to the plate surface of the original table glass 60, to read the image of the reflection original G in the sub-scanning direction.

Figure 12:
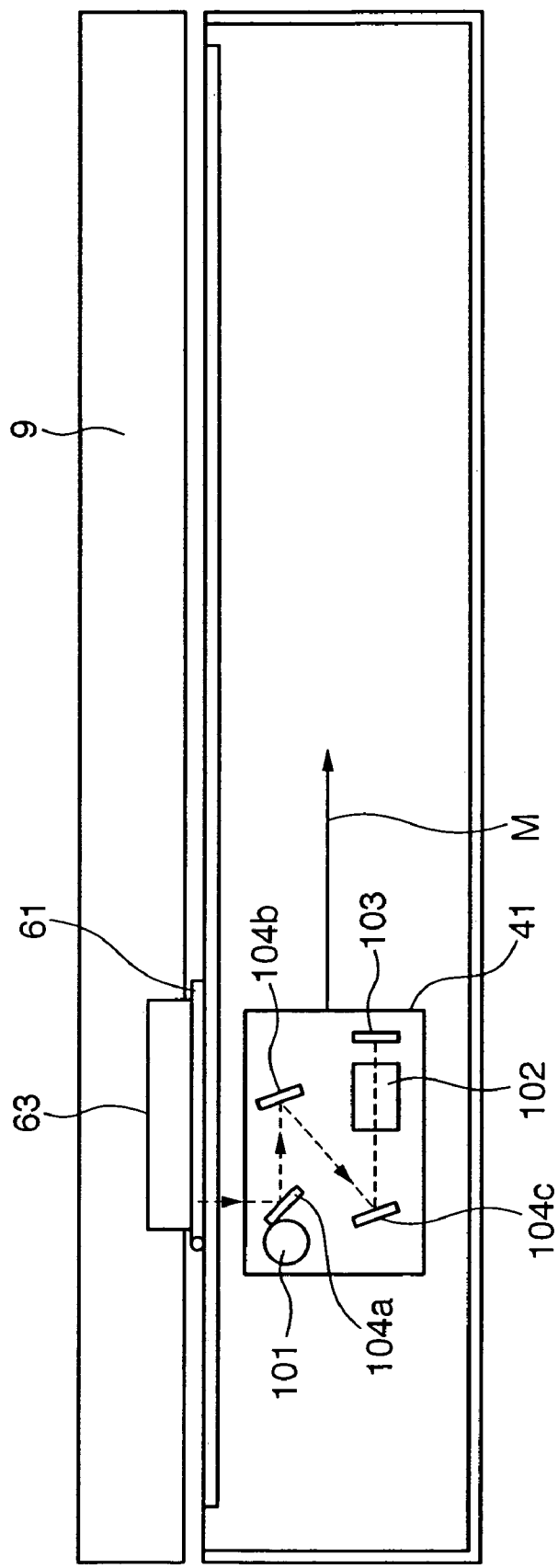
FIG. 12 is a sectional view of the image reading/printing apparatus according to the first embodiment of the present invention showing the state of the reading unit B when the transparent original is to be read.
Figure 21:
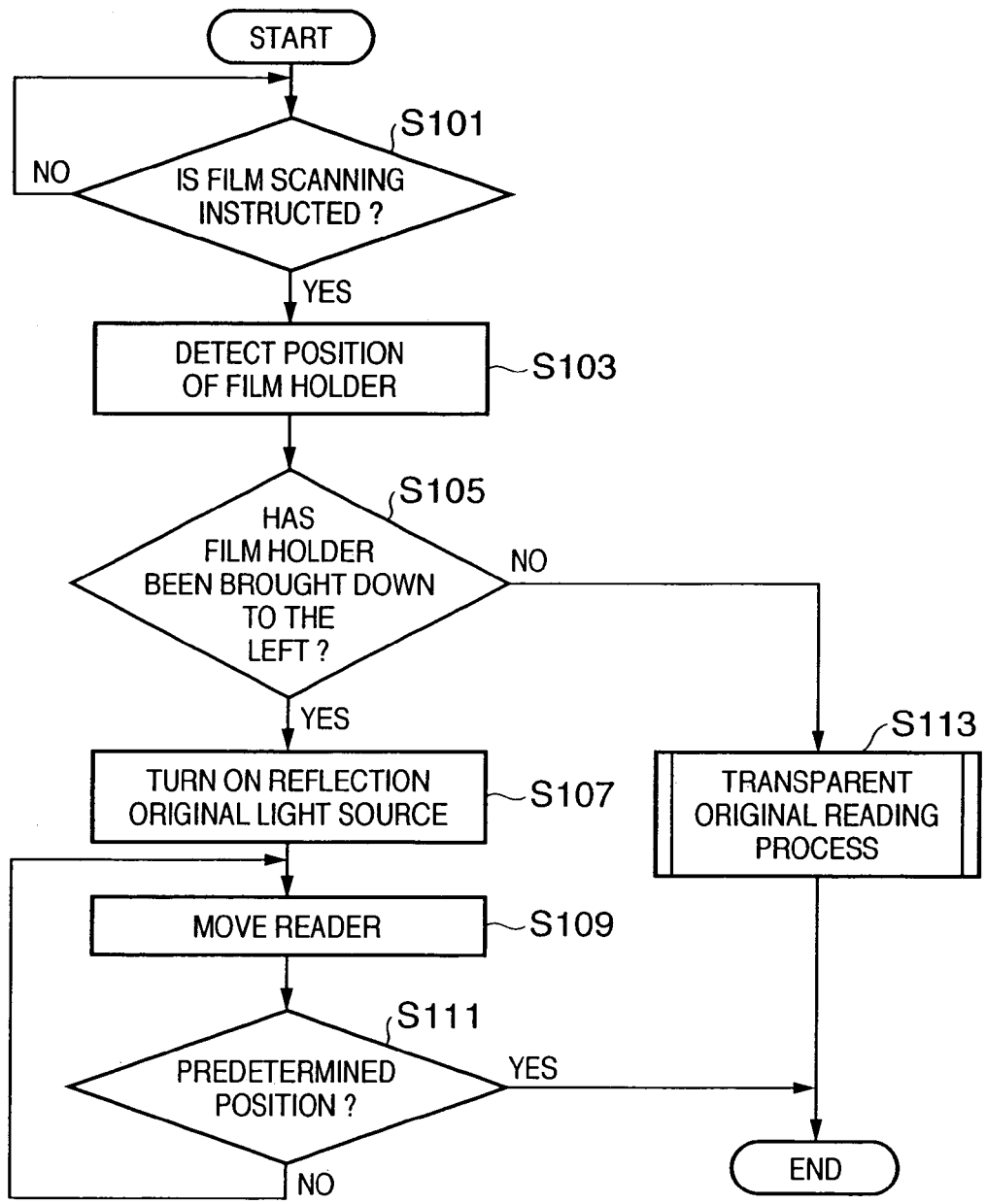
FIG. 21 is a flow chart for explaining a transparent original reading process in an image reading/printing apparatus according to the embodiment of FIG. 20 of the present invention.

The procedure for reading an image on a transparent original and the operation of the image reading/printing apparatus will be described with reference to FIGS. 11, 12, and 21.

First, the user opens the platen unit 9, brings down the film holder 61 to the left (the state shown in FIGS. 3 and 11), and mounts a negative film to be read in the film holder 61. At this time, the negative film is set such that its upper surface (base surface) comes to the upper side of the apparatus (that is, such that the lower surface of the film opposes the original table glass 60). This is opposite to the conventional method. A setting error will not occur easily because the user only needs to set the negative film such that the image can be seen correctly.

After the user mounts the negative film and brings down the film holder 61 to the left, he does not close the platen unit 9 but presses a film scan key (not shown) arranged on the operation panel. When it is detected that the film scan key is pressed (S101 in FIG. 21), the controller 620 (FIG. 20) arranged on the control board detects the state of the film holder position detection sensor 640, and checks to which side the film holder 61 has been brought down (S103).

In this case, as the film holder 61 is brought down to the left, the flow advances to S107. The transparent original light source 63 is not turned on but the reflection original light source 101 in the reader 41 is turned on. The driving unit 650 in the reading unit is controlled to rotate the motor so as to move the carriage in the sub-scanning direction (direction of an arrow K in FIG. 11) (S109). Because the carriage moves while the reflection original light source 101 is kept on, the user can check the content of the film image and whether the film is correctly set concerning its upper and lower sides. When the carriage moves to a predetermined position (S111), the CPU stop the movement of the carriage, and the reflection original light source 101 is turned off.

In the above operation, if the film is not set with its upper surface facing up, the film is set again. When it is determined that the film is set correctly concerning its upper and lower sides, then the user rotates the film holder 61 to the right to bring it down (to the state shown in FIG. 4, that is, such that the upper surface of the film opposes the original table glass 60). The user removes the white sheet unit 62 from the platen unit 9, and rotates the platen unit 9 to bring it down so that the platen unit 9 hangs over the original table glass 60. At this time, the transparent original light source 63 is located on the film holder 61.

When the user presses the film scan key on the operation panel, the controller 620 arranged on the control board detects this (S101), and checks by the film holder position detection sensor 640 in which direction the film holder 61 has been brought down (S103). It is detected that the film holder 61 is brought down to the right (S105), and a transparent original reading process is performed (S113).

More specifically, the reflection original light source 101 is not turned on but the transparent original light source 63 is turned on. Thus, the transmitted light image of the transparent original on the original table glass 60 irradiated by the transparent original light source 63 forms an image on the image-receiving portion of the image sensor 103 through the mirrors 104a, 104b, and 104c and condenser lens 102. The controller 620 controls the driving unit 650 to drive the motor disposed in the reading unit B. The carriage is thus moved in the sub-scanning direction (direction of an arrow M in FIG. 12) to read the image of the transparent original in the sub-scanning direction. When the carriage moves to the end position of the reading range, the process is ended.

As described above, according to this embodiment, the film holder is not merely placed on the original table glass as it is separate from the apparatus, but is mounted in the apparatus. Thus, the film holder can be positioned easily and its positional error can be prevented. When a reflection original is to be read, the film holder need not be detached. Missing of the film holder is prevented, and the cumbersome operation of taking out and setting the film holder can be eliminated.

The film holder can be reversed while it is mounted in the apparatus. The film may first be mounted in such a direction that the image on the film can be seen correctly. After that, the holder may be rotated. The user can mount the film without feeling any unnaturalness, and does not cause a mounting error easily.

As the mounted state of the film can be checked by using the reflection original light source, mounting errors can be further decreased.

(Second Embodiment)

Figure 13:
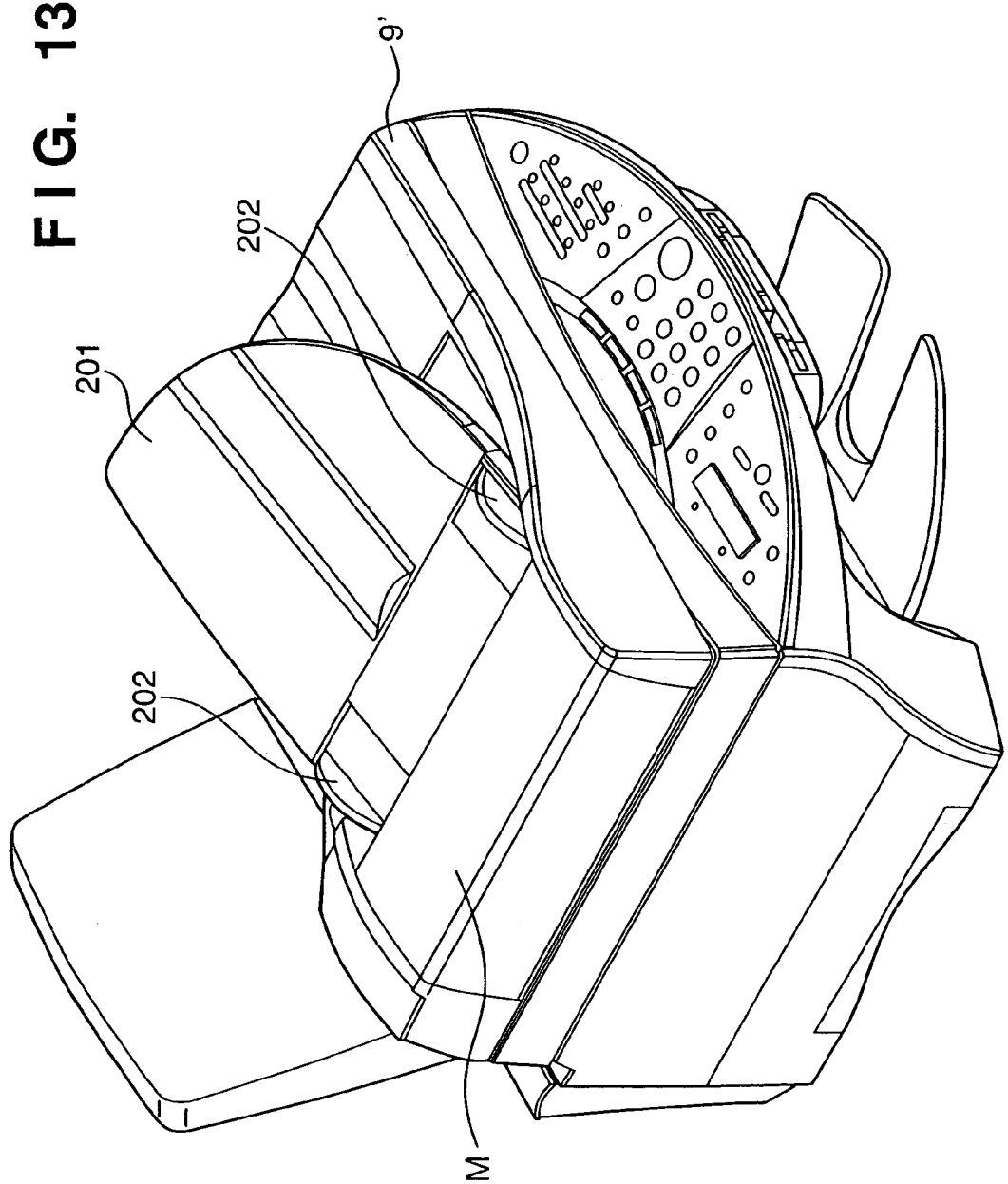
FIG. 13 is a perspective view of an image reading/printing apparatus according to the second embodiment of the present invention.

FIG. 13 is a perspective view showing the appearance of an image reading/printing apparatus according to the second embodiment of the present invention.

Figure 14:
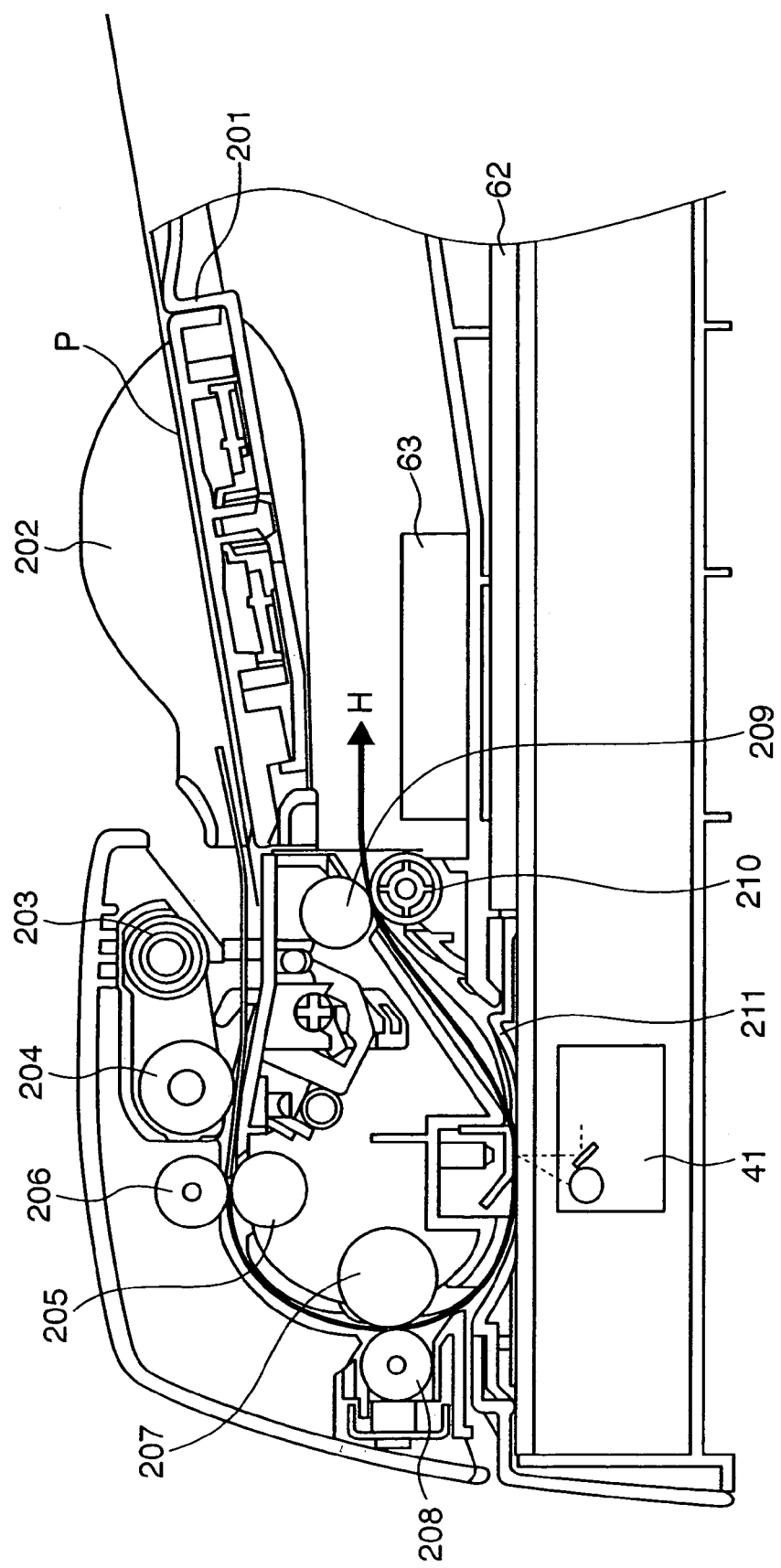
FIG. 14 is a sectional view showing the main structure of an automatic original separation/convey unit in the image reading/printing apparatus according to the second embodiment of the present invention.

The image reading/printing apparatus of this embodiment is an apparatus obtained by providing an automatic original separation/convey unit M to the platen unit 9 of the first embodiment. The automatic original separation/convey unit M includes an original stack tray 201 for stacking an original bundle thereon and an original slider 202 for regulating the widthwise direction of the original. Except for the arrangement concerning automatic conveyance of the original, a platen unit 9' according to this embodiment has the same structure as that of its counterpart of the first embodiment. Namely, the platen unit 9' incorporates a transparent original light source 63, and has a detachable white sheet unit 62 (FIG. 14).

Figure 15:
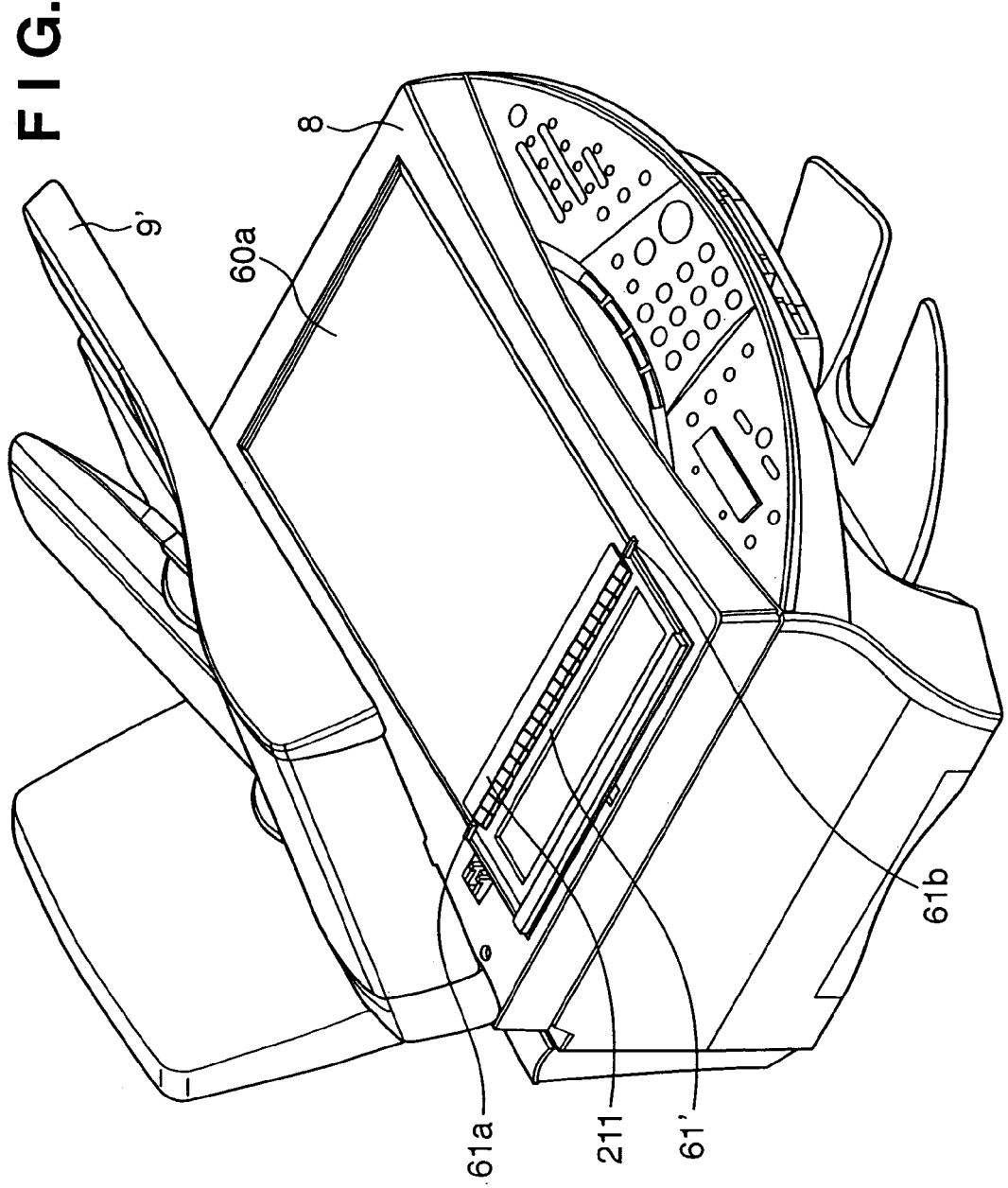
FIG. 15 is a perspective view of the image reading/printing apparatus according to the second embodiment of the present invention showing a state wherein a film holder is rotated to the left and brought down.
Figure 16:
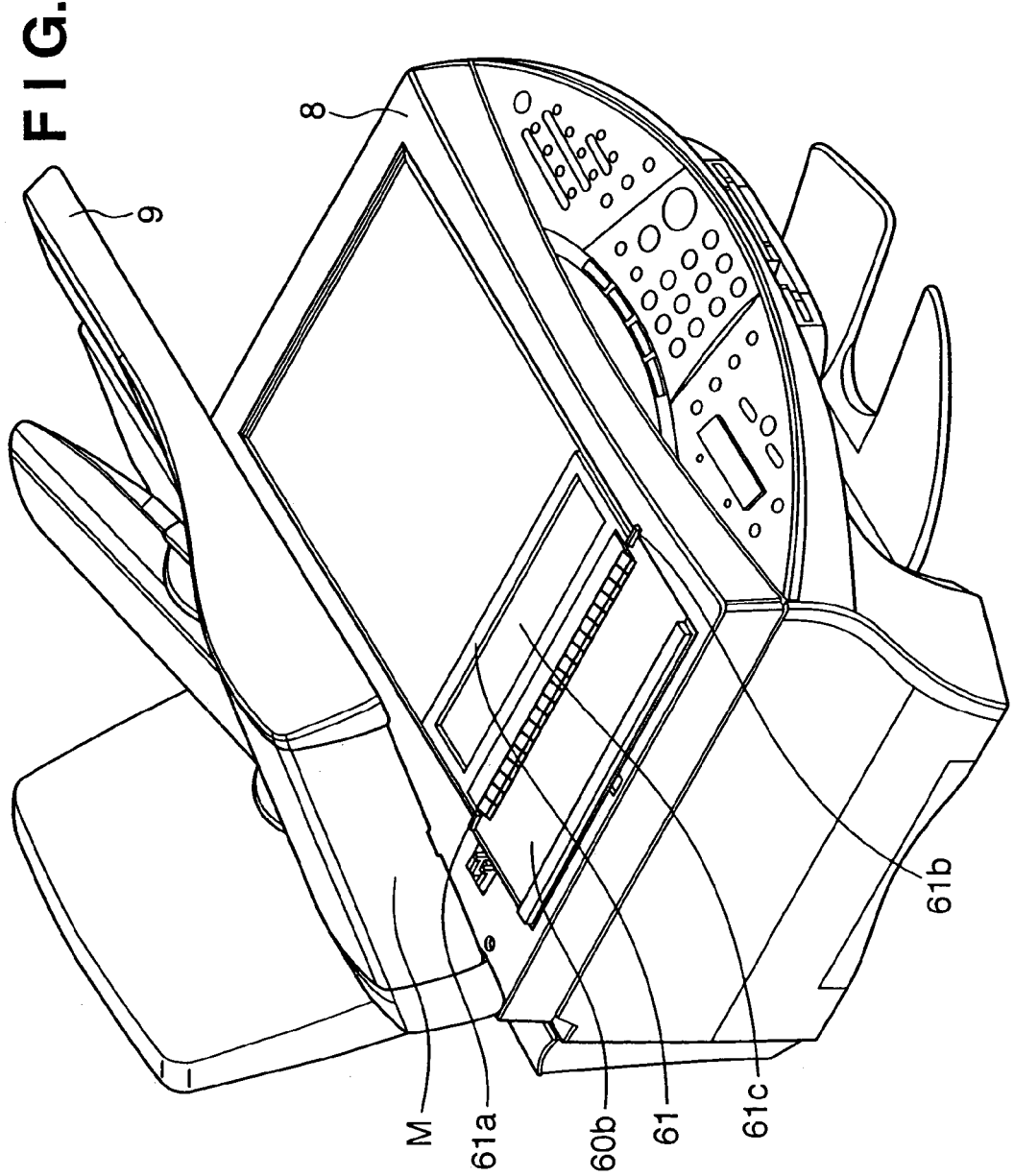
FIG. 16 is a perspective view of the image reading/printing apparatus according to the second embodiment of the present invention showing a state wherein the film holder is rotated to the right and brought down.

In the second embodiment, as shown in FIG. 15, on an original table glass 60, an area 60a on the right side of the apparatus forms a reflection original reading area to place a reflection original thereon and read its image (without using the automatic original separation/convey unit M). As shown in FIG. 16, on the original table glass 60, an area 60b on the left side of the apparatus forms an automatic conveyed original reading area to read the image of the reflection original conveyed by the automatic original separation/convey unit M. The two areas 60a and 60b are separated by a transparent guide sheet 211 which guides the original being conveyed by the automatic original separation/convey unit M.

An original convey path will be described with reference to the substantially sectional view of the automatic original separation/convey unit M shown in FIG. 14. An original bundle P stacked on the original stack tray 201 is conveyed by a pickup roller 203 to a separation roller 204. A separation plate made of a rubber material is located at a position opposing the separation roller 204 to be pressed by a spring against the separation roller 204. By the operation of the separation plate and separation roller 204, one original sheet is separated from the original bundle P conveyed by the pickup roller 203, and is conveyed to an extracting roller 205. The original is moved by the extracting roller 205 along a guide, and travels through feed rollers 207 and 208. After the original leaves the feed rollers 207 and 208, its image is read by an image reader 41. The original is then guided upward by the transparent guide sheet 211 to be conveyed to the delivery rollers 209 and 210, and delivered by the delivery rollers 209 and 210.

According to this embodiment, the transparent guide sheet 211 which forms part of the automatic original separation/convey unit M is formed on the original table glass 60. Therefore, the shape of a film holder 61' is different from its counterpart of the first embodiment. FIG. 17 is a perspective view of the film holder 61'. More specifically, two legs extend from the frame of the film holder 61' along the two sides of the transparent guide sheet 211 to enable the film holder 61' to pivot beyond the transparent guide sheet 211. Round shafts 61a and 61b are formed at the ends of the respective legs. The structure with which the round shafts 61a and 61b are attached to a scanner cover 8 can be the same as that of the first embodiment.

Figure 18:
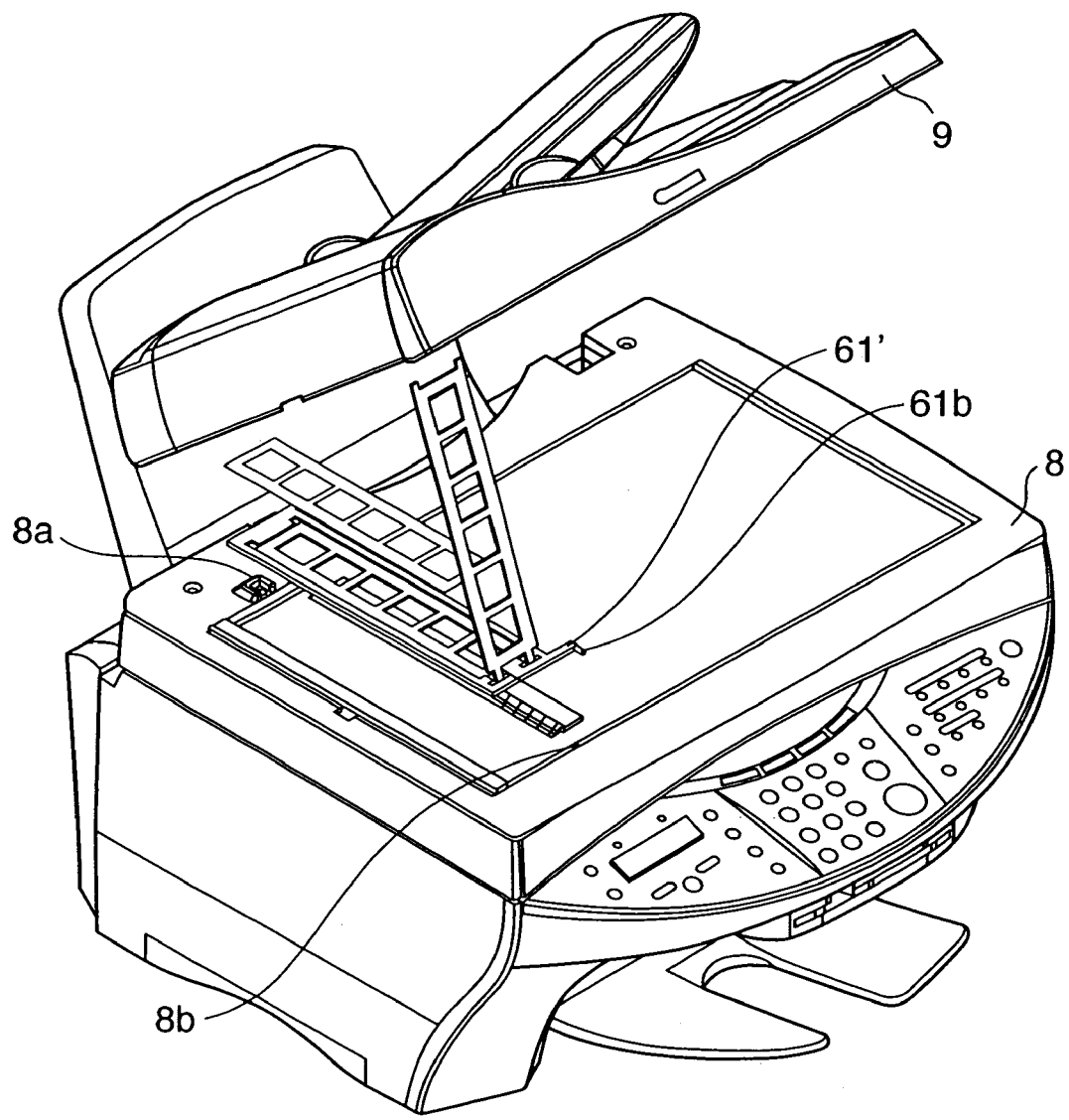
FIG. 18 is a perspective view showing how to attach the film holder to the image reading/printing apparatus.
Figure 19:
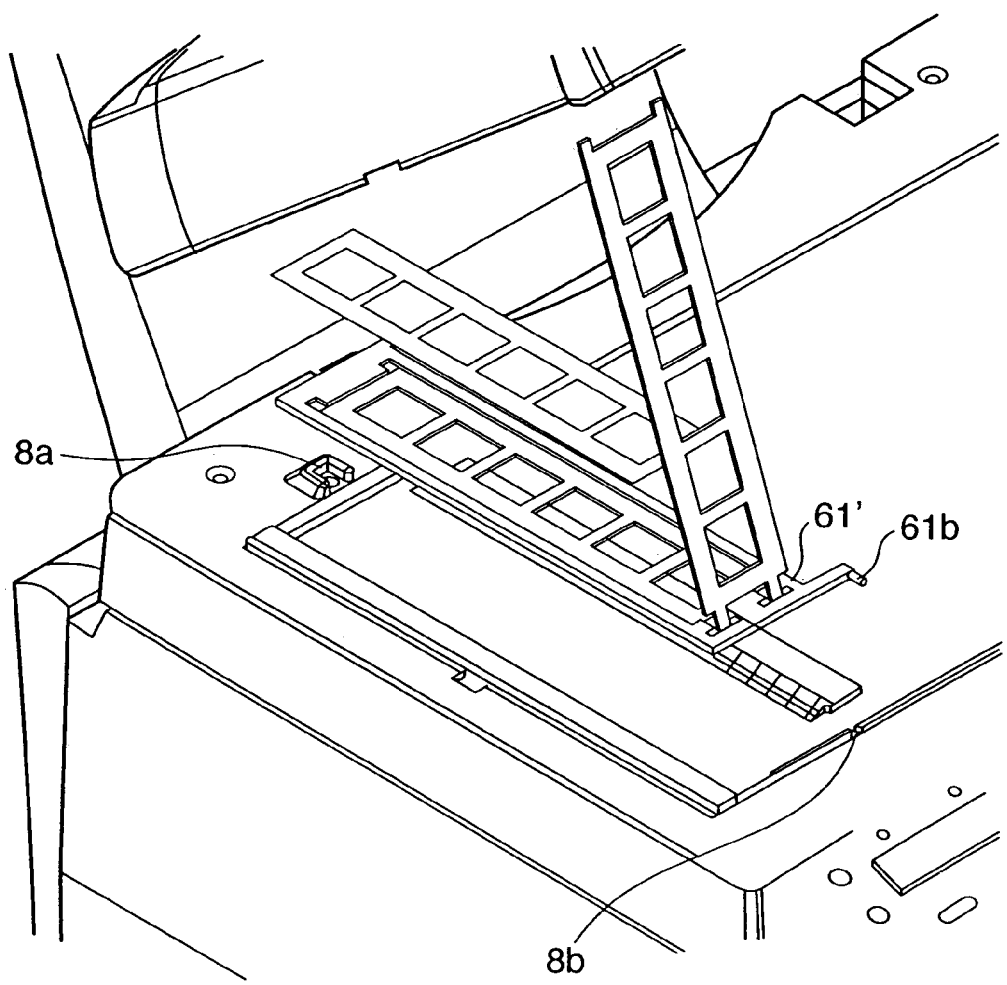
FIG. 19 is an enlarged view of FIG. 18.

FIG. 18 is a perspective view showing how to attach the film holder 61' to the image reading/printing apparatus, and FIG. 19 is an enlarged view of FIG. 18. The round shafts 61a and 61b of the film holder 61' are set by fitting them in recesses formed in the upper surface of the scanner cover 8. First, the round shaft 61b is inserted in a recess 8b formed in the front side of the upper surface of the scanner cover 8. Subsequently, the round shaft 61a is fitted in a recess 8a formed in the deep side of the upper surface of the scanner cover 8. The film holder 61' is thus attached to the scanner cover 8 of the image reading/printing apparatus.

In the apparatus according to this embodiment, when the image of the original is to be read by using the automatic original separation/convey unit M, the film holder 61' is brought down to the right to realize the state shown FIG. 16. The platen unit 9' is closed, and the original is set on the tray 201, so that the original can be read. When a reflection original is to be read without using the automatic original separation/convey unit M, the film holder 61' is brought down to the left to realize the state shown in FIG. 15. The original is set on the area 60a, and the platen unit 9' is closed, so that the original can be read.

In this embodiment, the position of the transparent original light source 63 of the platen unit 9' and the positions of the round shafts 61a and 61b on the scanner cover 8 are determined such that when the film holder 61' is rotated through 180° to be brought down onto the right area 60a of the original table glass 60 (FIG. 16), the film holder 61' is positioned within the transparent original reading area, in the same manner as in the first embodiment.

To which side the film holder 61' has been brought down can be determined in the same manner as in the first embodiment. More specifically, a holder sensor (not shown) formed of a photo-interrupter sensor is arranged in the vicinity of the round shaft 61a and in the reading unit. When the film holder 61' is brought down to the 60b side (FIG. 15), a rib (not shown) extending from the film holder 61' is fitted in the slit of the photo-interrupter sensor; when it is brought down to the 60a side, the rib is not fitted in the slit.

Operation control concerning reading of the reflection original placed on the area 60a and the transparent original using the film holder 61' can be the same as that in the first embodiment, and a detailed description thereof will be omitted.

As described above, according to the present invention, with the image reading/printing apparatus in which the automatic original separation/convey unit M is provided to the platen unit 9', the same effect as that of the first embodiment can also be obtained.

(Other Embodiment)

In the embodiments described above, after the image reader 41 is moved to check whether or not the transparent original is set correctly, the image reader 41 may be restored to the original position before reading the transparent original. Alternatively, after the image reader 41 is moved to check whether or not the transparent original is set correctly, it may be set in this state to wait, and then reading of the transparent original may be started.

As far as the film holder can reverse a transparent original mounted in it while the film holder is kept attached to the image reading apparatus, the film folder can have any other shape, or can be attached in any arbitrary manner.

The embodiments described above only exemplify a case wherein the film holder 61 is kept attached even when a reflection original placed on the original table glass is to be read. Alternatively, when a reflection original placed on the original table glass is to be read, the film holder 61 may be detached. In this case, although the effect of preventing missing of the film holder 61 cannot be obtained, other effects can still be realized.

The embodiments described above only exemplify a case wherein the shafts of the film holder are attached to the scanner cover directly. As far as the film holder can reverse a transparent original held in it while the film holder is kept attached to the image reading apparatus, in other words, as far as the film holder attached to the image reading unit can be selectively set at either one of the first position (where one surface of the film opposes the original table) and the second position (where the other surface of the film opposes the original table) that are different from each other by 180° in direction with respect to the original table, the shafts of the film holder can be attached through other members.

The film holder can be formed such that it can be reversed without changing its position on the original table, as in a structure shown in FIG. 22 in which the film holder is rotatably supported by a pair of support rods retractable into a reading unit B.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-009550 filed on Jan. 16, 2004, which is hereby incorporated by reference herein.

What is claimed is:

1. An image reading apparatus having a reflection original light source, a transparent original light source, and an image reading unit capable of reading a reflection original irradiated by said reflection original light source and a transparent original irradiated by said transparent original light source, comprising:
   an original table where the reflection original is to be placed; and
   a holding unit, attached at a predetermined position of said original table, adapted to hold the transparent original,
   wherein said holding unit holding the transparent original is capable of being selectively set at either one of first and second positions while said holding unit is kept attached to said original table without being detached from said original table, wherein in the first position, one side of the transparent original held by said holding unit faces said original table and said holding unit is in an area inside a reflection original reading range on said original table, and wherein in the second position, the other side of the transparent original held by said holding unit faces said original table and said holding unit is in an area outside the reflection original reading range on said original table.

2. The apparatus according to claim 1, wherein a position of said transparent original light source is determined to include, within an irradiation range thereof, said holding unit located at least at the first position.

3. An image forming apparatus which includes an image reading apparatus according to claim 1.

* * * * *